(12) United States Patent
Harada

(10) Patent No.: US 11,932,987 B2
(45) Date of Patent: Mar. 19, 2024

(54) SYNTHETIC LEATHER AND COATED ARTICLE

(71) Applicant: Toray Industries, Inc., Tokyo (JP)

(72) Inventor: Masaru Harada, Otsu (JP)

(73) Assignee: Toray Industries, Inc., Tokyo (JP)

( * ) Notice: Subject to any disclaimer, the term of this patent is extended or adjusted under 35 U.S.C. 154(b) by 295 days.

(21) Appl. No.: 17/605,284

(22) PCT Filed: Apr. 17, 2020

(86) PCT No.: PCT/JP2020/016835
§ 371 (c)(1),
(2) Date: Oct. 21, 2021

(87) PCT Pub. No.: WO2020/218178
PCT Pub. Date: Oct. 29, 2020

(65) Prior Publication Data
US 2022/0220666 A1    Jul. 14, 2022

(30) Foreign Application Priority Data

Apr. 25, 2019    (JP) .................................. 2019-083666

(51) Int. Cl.
*D06N 3/00*    (2006.01)
(52) U.S. Cl.
CPC ......... *D06N 3/0013* (2013.01); *D06N 3/0011* (2013.01); *D06N 2201/0272* (2013.01);
(Continued)

(58) Field of Classification Search
CPC .. D03D 15/283; D04H 1/4326; D04H 1/4334; D04H 1/4342; D04H 1/435;
(Continued)

(56) References Cited

U.S. PATENT DOCUMENTS 5,508,080 A    4/1996    Sorimachi et al.
2002/0182967 A1    12/2002    Erb, Jr. et al.
(Continued)

FOREIGN PATENT DOCUMENTS

CN    108486906 A    9/2018
CN    109642361    4/2019
(Continued)

OTHER PUBLICATIONS

Notification of the Second Office Action dated Jun. 1, 2023, of counterpart Chinese Patent Application No. 202080028855.9, along with an English translation.
(Continued)

*Primary Examiner* — Zachary M Davis
(74) *Attorney, Agent, or Firm* — DLA Piper LLP (US)

(57) ABSTRACT

A synthetic leather has excellent flame retardance and an article covered with the synthetic. The synthetic leather includes a fiber base material layer formed of a non-woven fabric sheet, wherein the non-woven fabric sheet includes at least one flameproof layer formed of a web including a non-melting fiber A having a high-temperature shrinkage rate of 3% or less and a thermal conductivity, conforming to ISO22007-3 (2008), of 0.060 W/m·K or less and is formed by bonding the flameproof layer to a scrim layer including a carbonized heat-resistant fiber B having an LOI value, conforming to JIS K 7201-2 (2007), of 25 or more, and a resin layer is laminated on a surface of the scrim layer, and a covered article covered with the synthetic leather.

12 Claims, 2 Drawing Sheets

(52) U.S. Cl.
CPC .... *D06N 2209/067* (2013.01); *D06N 2211/14* (2013.01); *D06N 2211/26* (2013.01); *D06N 2211/28* (2013.01)

(58) Field of Classification Search
CPC ...... D04H 1/4366; D06N 3/00; D06N 3/0002; D06N 3/0006; D06N 3/0011; D06N 3/0013; D06N 3/0015; D06N 3/0034; D06N 3/0036; D06N 3/04; D06N 3/042; D06N 3/12; D06N 3/121; D06N 3/125; D06N 3/18
See application file for complete search history.

(56) References Cited

U.S. PATENT DOCUMENTS

| | | |
|---|---|---|
| 2008/0070465 A1 | 3/2008 | Wiles |
| 2010/0247843 A1 | 9/2010 | Yoshida et al. |
| 2011/0207379 A1 | 8/2011 | Henkes |
| 2015/0132607 A1 | 5/2015 | Yamanaka et al. |
| 2015/0165745 A1 | 6/2015 | Kweon et al. |
| 2018/0187351 A1 | 7/2018 | Tsuchikura et al. |
| 2019/0382953 A1 | 12/2019 | Kubo et al. |
| 2020/0224341 A1 | 7/2020 | Harada et al. |
| 2021/0114332 A1 | 4/2021 | Hessenberger |
| 2021/0180247 A1* | 6/2021 | Hironaka ................ B32B 27/12 |

FOREIGN PATENT DOCUMENTS

| | | |
|---|---|---|
| JP | H07-227488 A | 8/1995 |
| JP | 2008-133578 A | 6/2008 |
| JP | 2010-077554 A | 4/2010 |
| JP | 4870412 B2 | 2/2012 |
| JP | 2014-025156 A | 2/2014 |
| WO | 2009/081760 A1 | 7/2009 |
| WO | 2013/187492 A1 | 12/2013 |
| WO | 2017/006807 A1 | 1/2017 |
| WO | 2018/123290 A1 | 7/2018 |
| WO | 2018/177808 A1 | 10/2018 |

OTHER PUBLICATIONS

J. Su, "Dictionary of Plastics Industry," Chemistry Industry Press, p. 447, First, Edition, 1989, along with an English translation.

First Office Action dated Jan. 9, 2023, of counterpart Chinese Patent Application No. 202080028855.9, along with an English translation.

Extended European Search Report dated Jan. 18, 2023, of counterpart European Patent Application No. 20794451.3.

Notice of Reasons for Refusal dated Mar. 7, 2023, of counterpart Japanese Patent Application No. 2020-544678, along with an English translation.

Third Office Action dated Sep. 23, 2023, of counterpart Chinese Patent Application No. 202080028855.9, along with an English translation.

G. Kellie, "Advanced Nonwoven Materials," High-tech Translation Series on Textile Science and Engineering, China Textile Press Co., Ltd., p. 61, 2019, along with an English translation.

* cited by examiner

SYNTHETIC LEATHER AND COATED ARTICLE

TECHNICAL FIELD

This disclosure relates to a synthetic leather and a covered article covered with a synthetic leather.

BACKGROUND

In recent years, synthetic leather has been used in a wide range of fields such as interior materials for aircraft, automobiles, railways, buildings, and furniture, as a substitute for natural leather. Such synthetic leather is required to have a soft texture, flexibility, mechanical strength, and durability. They are required to have flame retardance performance due to a disadvantage of being easily combusted.

For example, there are FMVSS-302 and JIS D-1201 for automobile interior materials, a nonmetallic material testing method for railway vehicles and a 45 degree ethyl alcohol method for railway interior materials, and JIS A-1321 for wall covering, and high flame retardance is required to pass these standards.

Furthermore, an aircraft sheet material is required to have flame retardance by a gasoline burner test for the entire sheet obtained by combining a skin material such as synthetic leather with a sheet cushion material, in addition to flame retardance of a synthetic leather alone as in a 12 second or 60 second vertical combustion test, and further required to have higher flame retardance.

The synthetic leather is formed by laminating a skin resin layer of polyurethane, polyolefin, polyvinyl chloride, or the like on a fiber base material layer of a woven fabric, a knitted fabric, a non-woven fabric or the like. An adhesive layer may be interposed between the fiber base material layer and the skin resin layer.

As the flame retardation of synthetic leather, a method of making at least one or more of a fiber base material layer, a skin resin layer, and an adhesive layer flame retardant has been reported, and it is roughly classified into a method of using a fiber having high flame retardance as a fiber constituting the fiber base material layer and a method of flame retardation by post-processing. In any of the methods, it is the mainstream to apply a flame retardant by various methods. But in recent years, from the viewpoint of environmental conservation and harmful-ness of gas produced during combustion, there has been an increasing demand for flame retardation without using a halogen-based flame retardant, and non-halogen-based flame retardants such as a phosphorus-based material and hydroxides, for example, ammonium phosphate, ammonium sulfamate, ammonium sulfate, borax, boric acid, aluminum hydroxide, magnesium hydroxide, and phosphate esters are known.

Generally, when the flame retardant is added in an amount required to exhibit a flame retardant effect, a water-soluble flame retardant has problems such as thickening and destruction (gumming up) of a synthetic resin emulsion or a solution, a decrease in resin filmed layer strength, heat resistance, and texture. Water resistance may be poor, a water mark may be produced due to contact with water, or flame retardant performance itself may be deteriorated. To solve those problems, a phosphorus-based flame retardant having a specific structure is disclosed (WO 2013-187492 A).

In addition, there is also disclosed a method of kneading a flame retardant in a fiber constituting a fiber base material layer and setting an LOI value of the fiber itself to 25 or more, thereby improving flame retardance as a fiber base material layer (JP 2010-77554 A).

However, in the conventional flame-retardant synthetic leather, the synthetic leather alone passes flame retardant tests such as FMVSS-302 or JIS D-1201 for automobile interior materials, a nonmetallic material test method for railway vehicles, a 45 degree ethyl alcohol method, JIS A-1321 for wall covering, and a 12 second or 60 second vertical combustion test for aircraft sheet materials. But when the synthetic leather is used as a skin material and combined with a seat cushion material to form a sheet, the obtained sheet does not have flame retardant performance enough to withstand a gasoline burner test as a whole and it is necessary to dispose thick felt of aramid type or inorganic fibers as a fire-resistant layer between the flame-retardant synthetic leather and the seat cushion material. The sheet on which the fire-resistant layer is disposed as described above has problems in that the sheet is hardened, the volume is increased, and the mass is also increased.

According to the method described in WO '492, when a flame retardant is added to a fiber base material layer by dipping processing, the fiber base material layer is integrated with a urethane-based resin layer, and then further backing processing is performed with a resin containing a flame retardant, the synthetic leather alone passes flame retardant standard tests for various applications. But when the synthetic leather is integrated with the sheet cushion material, the internal sheet cushion material is ignited by heating with a gasoline burner for a certain period of time. Thus, the standard of the aircraft sheet cushion is not satisfied unless a fire-resistant layer made of aramid-based felt is disposed.

In addition, based on the method described in JP '554, when a non-woven fabric felt having a LOI value of 25 or more is produced by using flame-retardant polyethylene terephthalate having a LOI value of 25 or more, in which a flame retardant is kneaded, and a synthetic leather is produced, holes are produced by gasoline burner heating and when integrated with a seat cushion, the cushion material is ignited, and thus, it cannot be said that flame retardance is sufficient.

That is, a synthetic leather which is a flame-retardant synthetic leather of an aircraft sheet and has enough excellent flame retardance to have sufficient flame retardance even when no fire-resistant layer is provided between the synthetic leather and a sheet cushion when the synthetic leather is integrated with the sheet cushion or the fire-resistant layer is thinner and lighter, has not been suggested. Thus, there is room to improve flame retardance as a synthetic leather. This makes it possible to reduce the weight and space of the entire aircraft seat and to improve ride comfort by improving a cushioning property.

In addition, since processing tension is applied in the step of producing synthetic leather, when form stability of the fiber base material layer is insufficient, the resin layer is cracked or the surface quality of synthetic leather is deteriorated in the step of laminating the resin layer of synthetic leather. Therefore, the fiber base material layer of the synthetic leather is required to have form stability. When a non-woven fabric is used as a fiber base material layer, form stability is poor, and thus a reinforcing layer composed of a woven or knitted fabric called a scrim is combined with the fiber base material layer. But there is also room for improvement in the configuration of the reinforcing layer to improve flame retardance as the fiber base material layer, and the surface quality of synthetic leather.

Therefore, it could be helpful to provide a synthetic leather having excellent mechanical strength and durability, high flame retardance, and can provide a covered article having excellent texture and good surface quality.

SUMMARY

We thus provide:

(1) A synthetic leather including a fiber base material layer formed of a non-woven fabric sheet and a resin layer formed on the fiber base material layer, wherein the non-woven fabric sheet includes at least one flameproof layer formed of a web including a non-melting fiber A having a high-temperature shrinkage rate of 3% or less and a thermal conductivity, conforming to ISO22007-3 (2008), of 0.060 W/m·K or less and is formed by bonding the flameproof layer to a scrim layer including a thermoplastic fiber B having an LOI value, conforming to JIS K 7201-2 (2007), of 25 or more.

(2) The synthetic leather described in (1), wherein an adhesive layer is provided between the fiber base material layer and the resin layer.

(3) The synthetic leather described in (1) or (2), wherein in the synthetic leather, a penetration depth of a skin resin layer or the adhesive layer into the fiber base material layer is 0.05 to 0.40 mm.

(4) The synthetic leather described in any one of (1) to (3), wherein a content of the non-melting fiber A is 15 to 70% by mass in the fiber base material layer.

(5) The synthetic leather described in any one of (1) to (4), wherein the fiber base material layer includes 30 to 85% by mass of the thermoplastic fiber B.

(6) The synthetic leather described in any one of (1) to (5), wherein the scrim layer included in the fiber base material layer includes 80% by mass or more of the thermoplastic fiber B.

(7) The synthetic leather described in any one of (1) to (6), wherein the non-melting fiber A is a flameproofed fiber or a meta-aramid-based fiber.

(8) The synthetic leather described in any one of (1) to (7), wherein the thermoplastic fiber B is a fiber formed of a resin selected from the group consisting of flame-retardant liquid crystalline polyester, flame-retardant poly(alkylene terephthalate), flame-retardant poly(acrylonitrile butadiene styrene), flame-retardant polysulfone, poly(ether-ether-ketone), poly(ether-ketone-ketone), polyethersulfone, polyarylate, polyarylene sulfide, polyphenylsulfone, polyetherimide, polyamideimide, and mixtures thereof (9) The synthetic leather described in any one of (1) to (8), wherein the thermoplastic fiber B is a fiber containing 15% by mass or more of a sulfur atom.

(10) The synthetic leather described in any one of (1) to (9), wherein the resin layer is laminated on a surface of the scrim layer of the fiber base material layer.

(11) The synthetic leather described in any one of (1) to (10), wherein a mass ratio of the fiber base material layer in the synthetic leather is 20 to 80% by mass.

(12) A covered article covered with the synthetic leather described in any one of (1) to (11)

(13) The covered article described in (12), wherein the covered article is a seat cushion material mounted on an aircraft, an automobile, or a ship.

The synthetic leather and the covered article covered with the synthetic leather have the above configuration, thereby having a soft texture, excellent mechanical strength and durability, and high flame retardance. In addition, since the fiber base material layer has excellent form stability, process passability in a synthetic leather production process is excellent and, as a result, the synthetic leather has excellent surface quality.

DESCRIPTION OF REFERENCE SIGNS

Figure 1:
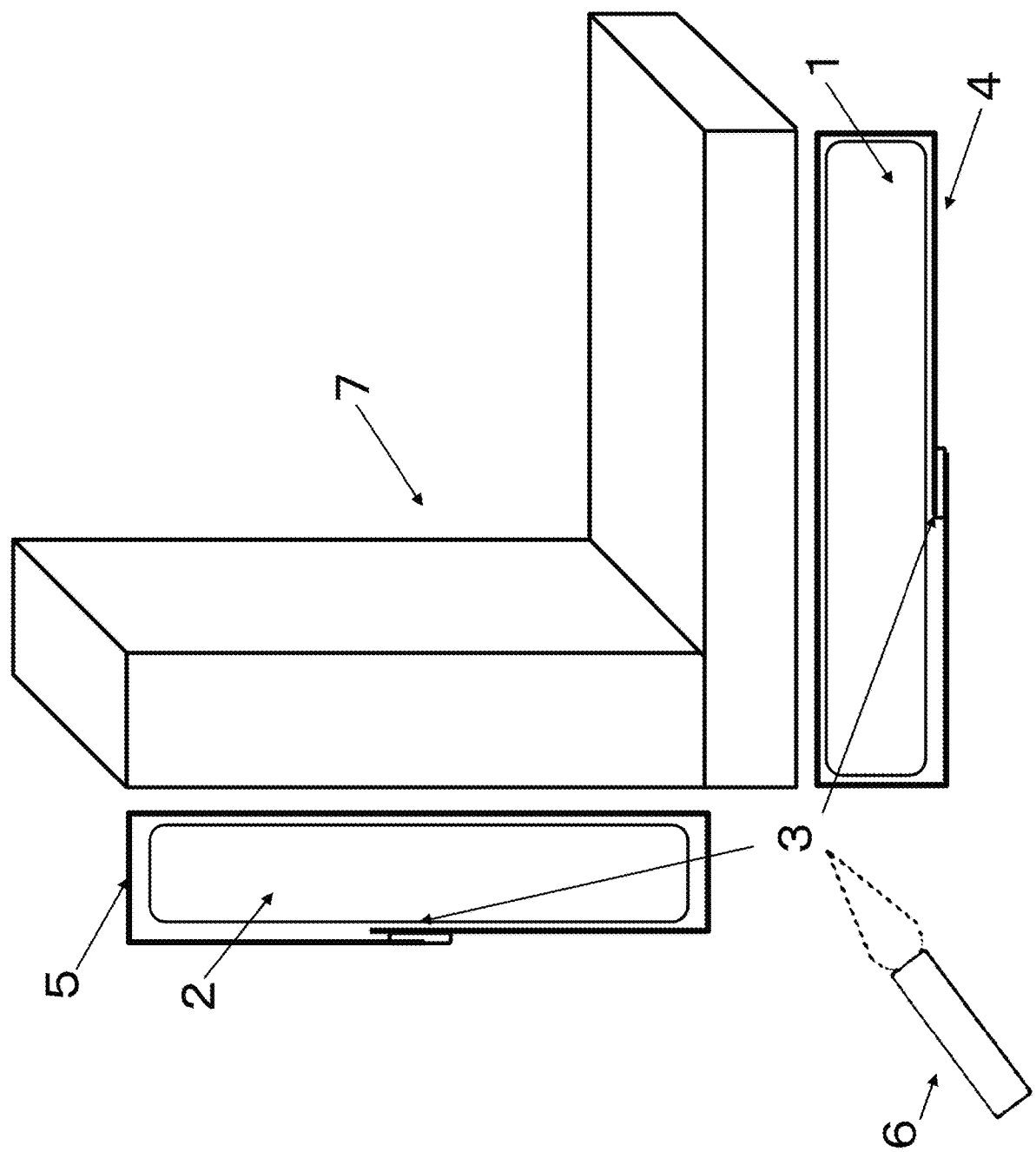
FIG. 1 is an illustration showing a method of assembling a covered article to evaluate flame retardance of the covered article used for a combustion test of an aircraft seat cushion and the combustion test.

1: Urethane foam (seat surface)
2: Urethane foam (back surface)
3: Velcro (registered trademark) tape
4: Skin material (seat surface)
5: Skin material (back surface)
6: Burner
7: Covered article
8: Interface of resin layer side of fiber base material layer in state of having resin layer laminated thereon
9: Interface of permeated resin Layer

DETAILED DESCRIPTION

My synthetic leather includes a fiber base material layer formed of a non-woven fabric sheet and a resin layer laminated on the fiber base material layer, wherein the non-woven fabric sheet includes at least one flameproof layer formed of a web including a non-melting fiber A having a high-temperature shrinkage rate of 3% or less and a thermal conductivity, conforming to ISO22007-3 (2008), of 0.060 W/m·K or less and is formed by bonding the flameproof layer to a scrim layer including a thermoplastic fiber B having an LOI value, conforming to JIS K 7201-2 (2007), of 25 or more.

High-Temperature Shrinkage Rate

A high-temperature shrinkage rate is a numerical value obtained by allowing a fiber to be a raw material of a non-woven fabric sheet to stand in a standard state (20° C., relative humidity: 65%) for 12 hours, applying a tension of 0.1 cN/dtex to the fiber to measure an original length L0, exposing the fiber to a dry heat atmosphere at 290° C. for 30 minutes without applying a load to the fiber, sufficiently cooling the fiber in the standard state (20° C., relative humidity: 65%), further applying a tension of 0.1 cN/dtex to the fiber to measure a length L1, and determining a value from L0 and L1 by formula (1):

$$\text{High-temperature shrinkage rate} = [(L0-L1)/L0] \times 100 \text{ (\%)} \quad (1).$$

When the flame approaches and heat is applied, a thermoplastic fiber melts, and the molten thermoplastic fiber spreads in a thin film shape along the surface of a non-melting fiber (aggregate). When the temperature further rises, both fibers are eventually carbonized, but since the high-temperature shrinkage rate of the non-melting fiber is 3% or less, the vicinity of the flame contact portion at a high temperature is less likely to shrink, and the non-woven fabric sheet is less likely to be broken due to thermal stress generated between a low-temperature portion being not in contact with flame and a high-temperature portion so that flame can be blocked for a long time. Thus, excellent flame retardance as a synthetic leather is achieved. In this respect, it is preferred that the high-temperature shrinkage rate is low, but even when the non-woven fabric is greatly expanded by heat without being shrunk, the non-woven fabric sheet is broken by thermal stress. Thus, it is preferred that the high-temperature shrinkage rate is −5% or more. In particular, the high-temperature shrinkage rate is preferably 0 to 2%.

Thermal Conductivity

Thermal conductivity is obtained by quantifying the ease of heat conduction, and having a low thermal conductivity means that when a material is heated from one surface, the temperature of an unheated portion rises less. A material having a thermal conductivity of 0.060 W/m·K or less as measured by a method in accordance with ISO 22007-3 (2008) and using a felt having a unit weight of 200 g/m² and a thickness of 2 mm (density: 100 kg/m³) as measured by a method in accordance with JIS L1913 (2010) as a test body hardly transmits heat, and when the material is formed into a non-woven fabric sheet and heated from one surface, a temperature rise on the opposite side being not heated can be suppressed and even if a flammable material is disposed on the opposite side, the inflammable material is less likely to be ignited. Therefore, when an article is covered with the synthetic leather, the flame retardance of the covered article can be maintained. It is preferred that the thermal conductivity is low, but the lower limit of the thermal conductivity for an easily available fiber material is about 0.020 W/m·K.

LOI Value

LOI value is a volume percentage of a minimum amount of oxygen required to sustain combustion of a substance in a mixed gas of nitrogen and oxygen, and it can be said that the higher the LOI value is, the more difficult it is to burn. Therefore, a thermoplastic fiber having an LOI value, conforming to JIS K 7201-2 (2007), of 25 or more is hard to burn, and even when ignited, the fire is extinguished immediately after a fire source is separated, and a carbonized layer is usually formed in a portion where the fire spreads slightly and the carbonized portion can prevent the spread of the fire. It is preferred that the LOI value is high, but the upper limit of the LOI value of a practically available substance is about 65.

Ignition Temperature

An ignition temperature is a spontaneous ignition temperature measured by a method in accordance with JIS K7193 (2010).

Melting Point

A melting point is a value measured by a method in accordance with JIS K7121 (2012). It refers to a value of a melting peak temperature when heating is performed at 10° C./min.

Fiber Base Material Layer Formed of Non-Woven Fabric Sheet Formed by Bonding Flameproof Layer to Scrim Layer A flameproof layer formed of a web including the non-melting fiber A described later is bonded to the scrim layer to form a non-woven fabric sheet. The scrim layer is bonded to the flameproof layer to function as a so-called reinforcing layer.

The scrim layer is preferably made of a woven fabric or a knitted fabric. Thus, by forming a regular and uniform structure of a woven fabric, a knitted fabric or the like with respect to the flameproof layer in which the fibers are randomly oriented, a non-woven fabric sheet having excellent form stability when brought into contact with flame and an excellent damage reduction property to the flameproof layer can be obtained. Since the non-woven fabric sheet has excellent form stability, the non-woven fabric sheet is not excessively stretched even with processing tension applied during the process of producing the synthetic leather and the process passability can also be improved.

In addition, since appropriate irregularities can be provided on a scrim surface by disposing the scrim, adhesiveness with a resin when laminating a resin layer of a synthetic leather is improved, peel strength as a synthetic leather is improved, and mechanical properties as a synthetic leather are also improved by improving mechanical properties of the non-woven fabric sheet.

That is, since the scrim layer functions as a form stabilization layer under a normal use environment not in contact with flame and during manufacture of synthetic leather, in addition to form stability and damage reduction to the flameproof layer when brought into contact with flame as described above, the fiber constituting the scrim layer preferably have high mechanical strength in addition to the high LOI value and the range of the melting point. Therefore, at least the thermoplastic fiber B described later is used for the scrim layer, but other fibers such as the non-melting fiber A and the fiber C described later may be mixed in the scrim layer in a range in which the desired effect is not impaired, for example, at about 10% by mass or less.

It is preferred that a resin layer is laminated on the surface of the scrim layer of the fiber base material layer, and it is also preferred that the scrim layer of the fiber base material layer and the resin layer constituting the synthetic leather are in contact with each other. That is, when the synthetic leather burns, the resin layer melts. At that time, the thermoplastic fiber B constituting the scrim layer has an effect of integrating with the melted resin layer to carbonize the resin layer, and the flame retardance as synthetic leather can be further enhanced. The scrim layer preferably includes 80% by mass or more of the thermoplastic fiber B.

Non-Melting Fiber A

A non-melting fiber A refers to a fiber that, when exposed to flame, does not liquefy and maintains a fiber shape and, preferably, the fiber does not liquefy and ignite at a temperature of 800° C. and, more preferably, the fiber does not liquefy and ignite at a temperature of 1000° C. or higher. Examples of the non-melting fiber having a high-temperature shrinkage rate within my range include flameproofed fibers, meta-aramid-based fibers, and glass fibers. The flameproofed fiber is a fiber obtained by subjecting a fiber selected from acrylonitrile-based, pitch-based, cellulose-based, phenol-based fibers and the like as a raw material to a flameproofing treatment. These may be used alone or in combination of two or more. In particular, a flameproofed fiber which has a low high-temperature shrinkage rate, undergoes carbonization by an oxygen blocking effect by a filmed layer formed when a thermoplastic fiber B described later is brought into contact with flame, and has further improved heat resistance at a high temperature is preferred, and among various flameproofed fibers, an acrylonitrile-based flameproofed fiber is more preferably used as a fiber which has a small specific gravity, is flexible, and has excellent flame retardance and such a flameproofed fiber is obtained by heating and oxidizing an acrylic fiber as a precursor in hot air. Examples of the commercially available product include a flameproofed fiber PYRON (registered trademark of the United States) manufactured by Zoltek Corporation used in the Examples and the Comparative Examples described later, and Pyromex (registered trademark) manufactured by TOHO Tenax Co., Ltd. In general, the meta-aramid-based fiber has a high high-temperature shrinkage rate and does not satisfy my high-temperature shrinkage rate, but any meta-aramid-based fiber can be preferably used as long as the meta-aramid-based fiber has a high-temperature shrinkage rate within my range by suppressing the high-temperature shrinkage rate.

The non-melting fiber preferably used is used alone or in combination with different materials, and a fiber length is preferably 30 to 120 mm, and more preferably 38 to 70 mm. When the fiber length is 38 to 70 mm, it is possible to form a non-woven fabric sheet by a general needle punch method or a water-jet interlacing method, and it is easy to combine the non-woven fabric with different materials.

The thickness of a single fiber of the non-melting fiber is not particularly limited, but a single fiber fineness is preferably 0.1 to 10 dtex from the viewpoint of a passing property in a carding process.

If the content of the non-melting fiber in the fiber base material layer including the flameproof layer and the scrim layer is too low, a function as an aggregate is insufficient. Thus, a mixing ratio of the non-melting fiber A in the fiber base material layer is preferably 15% by mass or more, and more preferably 20% by mass or more. The upper limit of the mass ratio is preferably 90% by mass or less, more preferably 80% by mass or less, and still more preferably 70% by mass or less, from the viewpoint of productivity of the fiber base material layer and strength of the fiber base material layer.

Thermoplastic Fiber B

The thermoplastic fiber B has a LOI value within my range and has a melting point lower than the ignition temperature of the non-melting fiber A (in an instance having no melting point, a melting temperature), and specific examples of the thermoplastic fiber B include fibers composed of a thermoplastic resin selected from the group consisting of flame-retardant liquid crystalline polyester, flame-retardant poly(alkylene terephthalate), flame-retardant poly(acrylonitrile butadiene styrene), flame-retardant polysulfone, poly(ether-ether-ketone), poly(ether-ketone-ketone), polyethersulfone, polyarylate, polyarylene sulfide, polyphenylsulfone, polyetherimide, polyamideimide, and mixtures thereof. These may be used alone or in combination of two or more. When the LOI value is within my range, combustion in air is suppressed, and the polymer is easily carbonized. In addition, since the melting point (in an instance having no melting point, a melting temperature) is lower than the ignition temperature of the non-melting fiber A, the molten polymer forms a filmed layer on the surface of the non-melting fiber A and between the fibers and the filmed layer is carbonized to increase the effect of blocking oxygen so that oxidative degradation of the non-melting fiber A can be suppressed, and since the carbonized layer exhibits an excellent flame blocking property, when used as a synthetic leather base material, the flame retardance of the entire covered article covered with the synthetic leather can be maintained. In addition, the molten polymer forms a film and is carbonized with the skin resin of the synthetic leather softened by heating and an adhesive material, whereby fire spreading on the surface of the synthetic leather can be suppressed.

The melting point of the thermoplastic fiber B (in an instance having no melting point, a melting temperature) is lower than the ignition temperature of the non-melting fiber A, preferably by 200° C. or more, and more preferably by 300° C. or more. Among them, a polyphenylene sulfide fiber (PPS fiber) is most preferred from the viewpoint of the height of the LOI value, the range of the melting point, and easy availability. In addition, even a polymer having a LOI value out of my range can be preferably used as long as it has a LOI value falling within my range after being treated with a flame retardant.

PPS is most preferred since a sulfur atom is contained in the polymer structure or the flame retardant to develop a mechanism to produce sulfuric acid during thermal decomposition of the polymer or the flame retardant to dehydrate and carbonize the polymer base material, and when the flame retardant is used, a sulfur-based flame retardant is preferred. It is preferred to use a fiber containing 15% by mass or more of a sulfur atom as the thermoplastic fiber B. Specific examples thereof include polyesters to which PPS or a sulfur-based flame retardant is added. The upper limit is preferably 50% by mass or less from the viewpoint of fiber strength.

The ratio of the sulfur atom as used herein can be determined by heating about 10 mg of a sample from room temperature to 800° C. at a rate of 10° C./min under an air flow condition using a thermogravimetric analyzer to oxidatively decompose the thermoplastic fiber, and quantitatively analyzing sulfur oxide in the decomposed gas by gas chromatography.

The thermoplastic fiber B is used as the thermoplastic resin alone or in a manner of combination with different materials, and the fiber length is preferably 30 to 120 mm, and more preferably 38 to 70 mm. When the fiber length is 38 to 70 mm, it is possible to form a non-woven fabric by a general needle punch method or a water-jet interlacing method, and it is easy to combine the non-woven fabric with different materials.

The thickness of a single fiber of the thermoplastic fiber B is not particularly limited, but a single fiber fineness is preferably 0.1 to 10 dtex from the viewpoint of a passing property in a carding process.

The PPS fiber preferably used is a synthetic fiber in which a polymer constituent unit is composed of a polymer having —($C_6H_4$—S)— as a main structural unit. Typical examples of the PPS polymers include polyphenylene sulfide, polyphenylene sulfide sulfone, polyphenylene sulfide ketone, random copolymers thereof, block copolymers thereof, mixtures thereof and the like. As a particularly preferable PPS polymer, polyphenylene sulfide containing a p-phenylene unit represented by —($C_6H_4$—S)— as a main structural unit of the polymer in an amount of preferably 90 mol % or more is desirable. From the viewpoint of mass, polyphenylene sulfide containing 80% by mass or more, and even 90% by mass or more of the p-phenylene unit is desirable.

The PPS fiber preferably used is used as the PPS fiber unit alone or in combination with different materials, and may be in the form of either a filament or a staple. When a staple is spun and used, the fiber length is preferably 30 to 120 mm, and more preferably 38 to 70 mm. When the fiber length is 38 to 70 mm, it is possible to form a non-woven fabric by a general needle punch method or a water-jet interlacing method, and it is easy to combine the non-woven fabric with different materials.

The thickness of a single fiber of the PPS is not particularly limited, but a single fiber fineness is preferably 0.1 to 10 dtex from the viewpoint of a passing property in a carding process.

The method of producing a PPS fiber is preferably a method of melting a polymer having the phenylene sulfide structural unit at or above the melting point and spinning the melted polymer from a spinneret to be a fibrous form. The spun fiber is an as-spun PPS fiber as it is. Most of the as-spun PPS fibers have an amorphous structure and the elongation at break is high. On the other hand, since the fiber has poor dimensional stability due to heat, a drawn yarn, which is oriented by heat-drawing following spinning to improve the strength and thermal dimensional stability of the fiber, is commercially available. A plurality of PPS fibers such as "TORCON" (registered trademark) (manufactured by Toray Industries, Inc.) and "PROCON" (registered trademark) (manufactured by TOYOBO CO., LTD.) are distributed.

The as-spun PPS fiber and the drawn yarn can be used in combination as long as my range is satisfied. Of course, the drawn yarn and the as-spun yarn of the fiber satisfying my range may be used in combination instead of the PPS fiber.

If the mixing ratio of the thermoplastic fiber B in the non-woven fabric sheet to be the fiber base material layer of the synthetic leather is too low, the thermoplastic fibers do not sufficiently spread in a film shape between the non-melting fibers of the aggregate, and thus the mixing ratio of the thermoplastic fiber B in the non-woven fabric sheet which is a fiber base material layer is preferably 10% by mass or more, more preferably 20% by mass or more, and still more preferably 30% by mass or more. If the mixing ratio of the thermoplastic fiber B is too high, the carbonized portion tends to be brittle at the time of flame contact and holes tend to be formed in a fiber base material layer portion. Thus, the upper limit of the mixing ratio is preferably 85% by mass or less, and more preferably 80% by mass or less.

Fiber C Other than Non-Melting Fiber A and Thermoplastic Fiber B

Fiber C other than the non-melting fiber A and the thermoplastic fiber B may be included to further add specific performance to the non-woven fabric sheet to be the fiber base material layer of the synthetic leather. For example, to improve the wettability of the non-woven fabric sheet, vinylon fiber, modified polyester fiber, nylon fiber or the like may be used. By changing the wettability, the penetration depth of the resin layer into the fiber base material layer in the synthetic leather production process described later can be changed. The mixing ratio of the fiber C is not particularly limited as long as the desired effect is not impaired, but the mixing ratio of the fiber C other than the non-melting fiber A and the thermoplastic fiber B in the non-woven fabric sheet is preferably 20% by mass or less, and more preferably 15% by mass or less. The lower limit in using the fiber C is 0% by mass since the fiber C is an optional component, but when the fiber C is used, the lower limit is not particularly limited as long as the desired performance is added, but about 10% by mass is usually preferred.

Fiber Base Material Layer Constituting Synthetic Leather

The unit weight of the non-woven fabric sheet of the fiber base material layer constituting the synthetic leather is preferably 50 g/m² or more, more preferably 100 g/m² or more, and still more preferably 150 g/m² or more, and is preferably 450 g/m² or less, more preferably 400 g/m² or less, and still more preferably 350 g/m² or less. When the unit weight of the fiber base material layer is within the above range, a lightweight synthetic leather for aircraft sheet skins having excellent mechanical properties is obtained.

The thickness of the non-woven fabric sheet of the fiber base material layer is measured by a method in accordance with JIS L-1913 (2010), and is preferably 0.4 mm or more. If the thickness of the non-woven fabric sheet is too thin, sufficient mechanical properties as a fiber base material layer cannot be obtained and sufficient flame retardance cannot be obtained, and when a resin layer of the synthetic leather is laminated, the resin layer or the adhesive layer escapes to the back side of the fiber base material layer and the quality of the synthetic leather is impaired. The upper limit of the thickness of the fiber base material layer is not particularly limited, and is preferably set from the mass and thickness of the synthetic leather.

As a form of the fiber used for the non-woven fabric sheet of the fiber base material layer, the number of crimps of the fiber is preferably 7/2.54 cm or more, and more preferably 12/2.54 cm or more, for sufficiently obtaining entanglement between fibers. The number of crimps is measured in accordance with JIS L 1015 (2010). The number of crimps is preferably measured in the state of raw cotton, but when it is difficult, may be measured using a sample obtained by decomposing the fiber base material layer.

The scrim layer is used as the fiber alone or in combination with different materials, and may be a short fiber or a long fiber.

In the short fiber, the fiber length is preferably 30 to 120 mm, and more preferably 38 to 51 mm. When the fiber length is 38 to 51 mm, it is easy to form a spun yarn in a general spinning process, and the obtained spun yarn is woven or knitted by a general method to form a woven or knitted fabric and form a scrim.

In the long fiber, grey yarn may be used as it is, or a scrim is formed by weaving or knitting after various commonly known textured-yarn processing.

It is preferred that the lengths of the short fibers of the non-melting fiber A and the thermoplastic fiber B are the same to obtain a more uniform non-woven fabric sheet. The same length may not be exactly the same, and there may be a difference of about ±5% with respect to the length of the non-melting fiber A. From the viewpoint as such, the fiber length of the non-melting fiber and the fiber length of thermoplastic fiber B or the fiber C are preferably 30 to 120 mm, and more preferably 38 to 70 mm.

The non-woven fabric sheet of the fiber base material layer of the synthetic leather is produced by interlacing a web produced using the short fiber, that is, a flameproof layer, and a scrim including the thermoplastic fiber B by a needle punch method, a water-jet interlacing method or the like.

The structure of the non-woven fabric sheet is not limited as long as it is within my range, but the density of the non-woven fabric sheet is preferably more than 50 kg/m³ and less than 200 kg/m³, more preferably 55 to 180 kg/m³, and still more preferably 70 to 160 kg/m³. If the density is too low, the synthetic leather excessively penetrates into the fiber base material layer when a skin resin layer or an adhesive layer is provided on the fiber base material layer so that the texture of the synthetic leather is excessively hardened or tear strength is decreased. On the other hand, if the density is too high, the fiber base material layer itself is excessively hardened, the texture of the synthetic leather is hardened, or the fiber base material layer is too dense so that adhesive strength with the surface resin layer or adhesive layer is decreased. The density is calculated by dividing the mass of a 30 cm square sample by the thickness measured by a method in accordance with JIS L 1913 (2010).

The mass ratio between the scrim layer and the flameproof layer (felt portion) is not particularly limited, but the mass ratio between the scrim layer and the flameproof layer (felt portion) is more preferably 70:30 to 30:70. When the mass ratio of the scrim layer is too low, the mechanical strength of the scrim layer is weak, and the effect of improving the form stability and mechanical properties as synthetic leather, which is the effect of the scrim layer, is small. On the other hand, when the mass ratio of the scrim layer is too high, that is, when the mass ratio of the flameproof layer (felt portion) is too low, the mechanical strength of the flameproof layer (felt portion) is weak, and the flameproof layer (felt portion) is likely to be broken in the step of integrating with the scrim layer, and the yarn density of the scrim portion has to be increased so that the texture of the synthetic leather is hardened.

The abundance ratio of the non-melting fiber A in the entire fiber base material layer for the scrim layer and the flameproof layer (felt portion) is preferably 0:100 to 50:50 for the scrim layer:flameproof layer (felt portion). In addition, the abundance ratio of the thermoplastic fiber B is preferably 100:0 to 40:60 for the scrim layer:flameproof layer (felt portion). Furthermore, in using the other fiber C, the scrim layer:the flameproof layer (felt portion) is preferably 100:0 to 50:50. The thermoplastic fiber B is melted when brought into contact with flame and is mixed with the resin layer of the synthetic leather to form a carbonized layer, and the carbonized layer is supported by the aggregate of the non-melting fiber A. Thus, it is preferred that the thermoplastic fiber B is unevenly distributed in the scrim layer in contact with the resin layer of synthetic leather, and the non-melting fiber A having excellent form stability at high temperature is unevenly distributed in the flameproof layer (felt portion) supporting the carbonized layer, from the viewpoint of the flame retardant performance of the entire synthetic leather. In addition, it is preferred that the other fiber C are unevenly distributed in the scrim layer in contact with the resin layer of the synthetic leather, from the viewpoint of the flame retardant performance of the entire synthetic leather, in that the other fiber C is mixed with the thermoplastic fiber A and the resin layer of the synthetic leather to form a carbonized layer, when brought into contact with flame.

The obtained fiber base material layer may be thermally set using a stenter or calendered. Of course, a gray fabric may be used as it is. A heat-set temperature may be a temperature at which the effect of suppressing a high-temperature shrinkage rate is obtained, and is preferably 160 to 240° C., and more preferably 190 to 230° C. A calendering process adjusts the thickness, that is, the density of the fiber base material layer. Therefore, the density is too low. Thus, the synthetic leather excessively penetrates into the fiber base material layer when a skin resin layer or an adhesive layer is provided on the fiber base material layer so that the texture of the synthetic leather may be excessively hardened too much or tear strength may be decreased. Hence, calendering may be performed before the skin resin layer or the adhesive layer is provided. When a non-woven fabric sheet having physical properties within my range is obtained, the speed, pressure, and temperature of the calender are not limited.

Method of Producing Synthetic Leather

The synthetic leather is usually produced by forming a resin layer on a fiber base material layer. A method of forming the resin layer is not particularly limited. Examples thereof include a dry method such as a method of applying a synthetic resin liquefied by a solvent and then drying the solvent to form a resin layer and a method of applying a liquid resin and then reacting the resin to form a resin layer; a lamination method of bonding a resin film made of a synthetic resin; a wet method of applying a liquid resin and then solidifying the resin in a coagulation bath; and the like. In addition, embossing or surface texturing can be performed on the surface of the synthetic leather as necessary to obtain a desired appearance. The skin resin layer may have a single-layer structure or a multilayer structure of two or more layers, by using the methods alone. In a multilayer structure of two or more layers, each resin layer may be formed by combining a plurality of the methods.

Resin Layer

Examples of a synthetic resin to form a resin layer include a polyurethane resin, a polyamide resin, a polyacrylate resin, a vinyl acetate resin, a polyacrylonitrile resin, polyvinyl acetate, an ethylene-vinyl acetate copolymer, styrene-butadiene rubber (SBR), vinyl chloride, vinylidene chloride and the like. The synthetic resins may be used alone or in combination of two or more. Among them, a polyurethane resin is suitable.

A specific constituent component of the polyurethane resin is generally referred to as a polyurethane resin or a polyurethane urea resin, and is obtained by reacting one or a mixture of a polyalkylene ether glycol having a molecular weight of 400 to 4000, a polyester polyol having a hydroxyl group at the terminal, a poly ε-caprolactone polyol, or a polycarbonate polyol with an organic diisocyanate, and is obtained by chain extension with a compound having two active hydrogens as necessary.

Examples of the polyalkylene ether glycol include polytetramethylene ether glycol, polypropylene glycol, polyethylene glycol, a glycerin propylene oxide adduct, polyether polyol with ethylene oxide added at the terminal, and vinyl monomer grafted polyether polyol. Examples of the polyester polyol include those obtained by reacting an alkylene glycol such as ethylene glycol, butylene glycol, hexylene glycol, diethylene glycol, dipropylene glycol, or neopentyl glycol with a carboxylic acid such as succinic acid, glutaric acid, adipic acid, sebacic acid, maleic acid, fumaric acid, phthalic acid, or trimellitic acid so that the terminal is a hydroxyl acid. Examples of the polycarbonate polyol include polyethylene carbonate diol, polytetramethylene carbonate diol, and polyhexamethylene carbonate diol.

Examples of the organic diisocyanate include aromatic isocyanates such as 2,4- and 2,6-tolylene diisocyanate, 4,4'-diphenylmethane diisocyanate, 1,5-naphthalene diisocyanate, and xylylene diisocyanate; and aliphatic isocyanates such as 1,6-hexamethylene diisocyanate, dicyclohexylmethane-4,4'-diisocyanate, 3-isocyanatomethyl-3,5,5'-trimethylcyclohexyl isocyanate, and 2,6-diisocyanate methylcaproate, and these may be used alone or in combination of two or more.

As the chain extender, hydrazine, ethylenediamine, tetramethylenediamine, water, piperazine, isophoronediamine, ethylene glycol, butylene glycol, hexylene glycol, diethylene glycol, dipropylene glycol, neopentyl glycol and the like, or glycols and diamines capable of improving hydrophilicity such as an ethylene oxide adduct to dimethylolpropionic acid and aminoethanesulfonic acid can be used alone or in combination.

As the polyurethane resin, a polycarbonate-based polyurethane resin using polycarbonate polyol as a constituent component is preferable since it has excellent hydrolysis resistance. In particular, a silicone-modified polycarbonate-based polyurethane resin is preferably used for the resin layer present on the outermost surface of the synthetic leather, to improve the texture of the synthetic leather.

The silicone-modified polycarbonate-based polyurethane is a polycarbonate-based polyurethane having an organopolysiloxane skeleton in a molecular chain or having an organopolysiloxane skeleton sealed with a functional group nonreactive with an isocyanate group, for example, a trialkylsilyl group, a triarylsilyl group, or the like at a molecular chain terminal.

Adhesive Layer

When the resin layer is laminated by a lamination method, an adhesive is used to bond the resin film. As the adhesive, an ethylene-vinyl acetate copolymer emulsion, a polyvinyl chloride paste, a polyurethane adhesive, an epoxy adhesive or the like is used. Among them, it is preferred to use a polyurethane-based adhesive in consideration of adhesive strength with the resin layer and prevention of excessive texture hardening by the adhesive.

The polyurethane resin constituting the adhesive may be a polyester-based polyurethane resin, a polyether-based polyurethane resin, a polycarbonate-based polyurethane resin, a mixed system thereof or the like and, for example, is those having an average molecular weight of about 10000 to 40000 obtained from at least one diol selected from polymer diols having an average molecular weight of about 500 to 2500, for example, a polyester diol, a polyether diol, a polyester ether diol, a polycaprolactone diol, a polycarbonate diol and the like, and at least one or more organic polyisocyanates selected from organic polyisocyanates, for example, an aromatic diisocyanate, an aromatic triisocyanate, an alicyclic diisocyanate and the like, and as a urethane resin, a commercially available solution having a solid content of 40 to 70% by mass can be used. In particular, a polyester-based urethane resin is preferred. In addition, a cured product of the adhesive has a 100% modulus of preferably 0.5 to 5 MPa, and particularly preferably 0.5 to 3 MPa in consideration of bending resistance, as measured in accordance with JIS K-6251 (2017).

The adhesive may be applied to the surface of the fiber base material or the surface of a resin sheet. Either of an adhesive for wet lamination in which the fiber base material layer and the skin resin layer are bonded to each other without drying the solvent and an adhesive for dry lamination in which the fiber base material layer and the skin resin layer are bonded to each other after drying the solvent may be used, and a urethane curing agent or a urethanization catalyst can be used for reducing a process load and improving the physical properties of synthetic leather.

Flame Retardant and Other Additives

To further improve the flame retardance, a flame retardant may be included in the resin layer, the adhesive layer, or both. The flame retardant to be used is not particularly limited, and specific examples thereof include inorganic flame retardants such as aluminum hydroxide, titanium oxide, zinc oxide, expandable graphite, magnesium hydroxide, calcium carbonate, zinc borate, ammonium polyphosphate, aluminum diethylphosphinate, and red phosphorus; organic flame retardants such as polyphosphoric acid, melamine, melamine cyanurate, phosphate ester-based compounds, phosphate ester-based amide-based compounds and the like, and may be used alone or in combination of two or more.

Examples of the phosphate ester-based compound include trioctyl phosphate, triphenyl phosphate, tricresyl phosphate, trixylenyl phosphate, cresyl diphenyl phosphate, cresyl di-2,6-xylenyl phosphate, isopropyl phenyl phosphate, tert-butyl phenyl phosphate, biphenyl diphenyl phosphate, naphthyl diphenyl phosphate, resorcinol bis(diphenyl phosphate), resorcinol bis(dixylenyl phosphate), bisphenol A bis(diphenyl phosphate), tris(chloropropyl) phosphate, tris(dichloropropyl) phosphate, tris(tribromoneopentyl) phosphate and the like.

Among the flame retardants, those that promote carbonization such as a phosphate ester-based compound, a phosphate ester amide-based compound, and aluminum diethylphosphinate, are preferable from the viewpoint of synergizing with the carbonization action of the fiber base material layer.

When the flame retardant is used in the resin layer, the adhesive layer, or both, the content of the flame retardant included in the layer is preferably 1 to 300 parts by mass, more preferably 5 to 250 parts by mass, and still more preferably 10 to 200 parts by mass with respect to 100 parts by mass of the solid content of the resin layer or the adhesive layer. Even when the resin layer or the adhesive layer, or both of them do not include a flame retardant at all, the synthetic leather has excellent flame retardant performance as a whole by the excellent flame resistant performance of the fiber base material layer. But when the resin layer or the adhesive layer, or both of them include a flame retardant within the above range, the flame retardant performance of the synthetic leather is further improved. On the other hand, when the content of the flame retardant included in the resin layer, the adhesive layer, or both of them is too high, there are concerns about problems such as a change in appearance such as hardening of texture and a water mark, a decrease in light resistance, and occurrence of delamination of synthetic leather due to a decrease in adhesive strength of the adhesive. The term "water mark" refers to an appearance defect which appears as a stain when droplets of water, alcohol or the like are dropped and dried and is, for example, a stain-shaped thing that occurs when water adheres to synthetic leather including a flame retardant and is dried while a flame retardant is slightly dissolved in the adhered water.

Further, to the synthetic leather, various additives such as an antimicrobial/insect repellent, an antistatic agent, a lubricant, a light resistance improver, a heat resistance improver, an ultraviolet absorber, an antioxidant, a water repellent, a crosslinking agent, a plasticizer, a colorant, and an antifoaming agent; a surfactant such as a dispersant and a penetrant, and a stabilizer such as a thickener; and a filler such as clay, talc, mica, expandable graphite, wollastonite, kaolin, montmorillonite, bentonite, sepiolite, xonotlite, and silica may be added as necessary.

Unit Weight and Thickness of Synthetic Leather and Resin Layer

The thickness of the synthetic leather is preferably 0.5 to 4.0 mm, more preferably 0.7 to 3.5 mm, and still more preferably 0.9 to 3.0 mm from the viewpoint of flame retardant performance, wear durability, texture, and space saving of a covered article such as a sheet. When the thickness is smaller than the above range, wear durability is poor, and the flame retardance of the entire covered article such as a sheet when integrated with an article such as a sheet cushion material is deteriorated. On the other hand, when the thickness is larger than the above range, the texture is hardened.

The unit weight of the synthetic leather is preferably 150 to 1000 g/m$^2$, more preferably 170 to 800 g/m$^2$, and still more preferably 200 to 600 g/m$^2$ from the viewpoint of flame retardant performance, wear durability, texture, and weight reduction of a covered article such as a sheet. When the unit weight is less than the above range, wear durability is poor, and the flame retardance of the entire covered article such as a sheet when integrated with an article such as a sheet cushion material is deteriorated. On the other hand, when the unit weight is more than the above range, the entire covered article such as a sheet becomes too heavy and the merit of weight reduction cannot be obtained.

In addition, a mass ratio of the fiber base material layer to the total mass of the synthetic leather is preferably 20% by mass or more, more preferably 30% by mass or more, and still more preferably 40% by mass or more. Since the fiber base material layer constituting the synthetic leather exhibits excellent flame retardant performance as the fiber base material layer alone, when the mass ratio of the fiber base material layer is lower than the above range, there is a concern that the flame retardance of the synthetic leather alone or the covered article such as a sheet may be decreased. On the other hand, the upper limit of the mass ratio of the fiber base material layer is not particularly limited, but is preferably 80% by mass or less, more preferably 75% by mass or less, and still more preferably 70% by mass or less from the viewpoint of achieving the surface feeling and functionality as synthetic leather.

When the resin layer is laminated on the fiber base material layer by a dry method and a wet method, the resin layer is directly applied on or transferred to the fiber base material layer so that the resin layer directly penetrates into the fiber base material layer. On the other hand, when the resin layer is laminated by a lamination method, the resin layer is formed on a release paper or a release film, and is laminated on the fiber base material layer via an adhesive so that the adhesive layer penetrates into the fiber base material layer. The penetration depth of the resin layer or the adhesive layer into the fiber base material layer in the thickness direction of the synthetic leather affects peel strength between the fiber base material layer and the resin layer of the synthetic leather and the texture of the synthetic leather. The penetration depth of the resin layer or the adhesive layer into the fiber base material layer is preferably 0.05 to 0.40 mm, more preferably 0.07 to 0.38 mm, and still more preferably 0.10 to 0.35 mm, from the viewpoint of achieving both the texture of the synthetic leather and the peel strength between the fiber base material layer and the resin layer. When the penetration depth of the resin layer or the adhesive layer into the fiber base material layer is equal to or more than the lower limit of the above range, wear durability of synthetic leather and peel strength between the fiber base material layer and the resin layer are particularly excellent. On the other hand, when the penetration depth of the resin layer or the adhesive layer into the fiber base material layer is equal to or less than the upper limit of the above range, the texture is particularly excellent. To set the penetration depth of the resin layer or the adhesive layer into the fiber base material layer within the above range, the molecular weight of the substance described in "Resin layer" or "Adhesive layer," the concentration at which the substance is diluted with a solvent, the temperature and speed at which the solvent is dried in the dry method, the temperature of the coagulation bath and the concentration of the poor solvent in the wet method, and the temperature and pressure at the time of lamination in the lamination method can be appropriately adjusted.

In addition, it is preferred that the surface of the fiber base material layer on which the resin layer is laminated is a scrim surface, from the viewpoint that the resin layer is firmly bonded to the fiber base material layer by an anchor effect of the unevenness due to the scrim and the fluff of the fibers constituting the felt protruding from the gap of the scrim so that the peel strength as synthetic leather is excellent. The density of the scrim may be appropriately selected, but the cover factor of the scrim is preferably 600 to 2000 in a woven fabric. In a knitted fabric, the density is preferably 500 to 1700. A sufficient reinforcing effect as a scrim can be obtained at the lower limit or more of the above range, the peel strength improving effect is particularly excellent, and the overall mechanical properties as the synthetic leather are also excellent. On the other hand, when the content is equal to or less than the upper limit of the above range, the texture of the synthetic leather is soft. In a woven fabric, when the fineness of the warp and the weft of the scrim is D1 (dTex) and D2 (dTex), respectively, and the yarn density of the warp and the weft is N1 (yarns/25.4 mm) and N2 (yarns/25.4 mm), respectively, the cover factor is given by formula (2):

$$\text{Cover factor (woven fabric)} = (N1 \times \sqrt{D1}) + (N2 \times \sqrt{D2}) \quad (2).$$

In a knitted fabric, when the fineness of the yarn constituting the knitted fabric is D3 (dtex), the number of loops in the course direction of the knitted fabric is C (loops/25.4 mm), and the number of loops in the wale direction is W (loops/25.4 mm), it is given by formula (3). When fibers having different fineness in the course direction or the wale direction, respectively, are used, the calculation is performed using different fineness in the course direction and the wale direction, respectively.

$$\text{Cover factor (knitted fabric)} = (C \times \sqrt{D3}) + (W \times \sqrt{D3}) \quad (3).$$

Application of Synthetic Leather

The thus-obtained synthetic leather has excellent flame retardance and also has excellent physical properties such as texture and peel strength, and the flame retardant performance is effective not only for the synthetic leather alone but also for the entire covered article when the synthetic leather covers an article such as a cushion foam. Therefore, the synthetic leather can be used as a mounting material covering a seat cushion material or the like in addition to being directly used as decoration of a ceiling or a wall surface. Among them, the synthetic leather can be particularly suitably used as a mounting material for covering a seat cushion material mounted on aircrafts, automobiles, railways, and ships which are required to have high flame retardance, and a mounting material for chairs and sofas in high-rise buildings and public facilities. In particular, it is particularly preferred to use a seat cushion material mounted on aircrafts, automobiles, or ships as a covered article covered with the synthetic leather as a mounting material.

EXAMPLES

Next, my synthetic leather and coated articles will be described in detail, based on the Examples. However, this disclosure is not limited only to the Examples. Various modifications and corrections can be made without departing from the technical scope of this disclosure. Methods of measuring various properties used in the Examples are as follows.

Unit Weight of Fiber Base Material Layer

The mass of a 30 cm square sample was measured and expressed in mass per 1 $m^2$ ($g/m^2$). When it is difficult to measure the fiber base material layer alone in a state where the measurement sample is synthetic leather, a value calculated by peeling off and removing the resin layer using a synthetic leather sample of an arbitrary area and dividing the mass of the fiber base material portion by the sample area may be used.

Unit Weight of Synthetic Leather

The mass of a 30 cm square sample was measured and expressed in mass per 1 $m^2$ ($g/m^2$). When the measurement sample is smaller than a 30 cm square, a value calculated by dividing the sample mass by the area of the sample may be used.

Unit Weight of Resin Layer/adhesive Layer

It is defined as a mass difference ($g/m^2$) between the (unit weight of synthetic leather) and the (unit weight of fiber base material layer).

Mass Ratio of Fiber Base Material Layer to Entire Synthetic Leather

It is a ratio obtained by dividing the (unit weight of fiber base material layer) by the (unit weight of synthetic leather).

Thickness of Fiber Base Material Layer

The thickness of the fiber base material layer was measured in accordance with JIS L-1913 (2010). When the measurement sample was in a state of synthetic leather and it was difficult to perform measurement with the fiber base material layer alone, in the cross section of the sample, imaging was performed at a magnification at which the entire synthetic leather in the thickness direction was about 50 to 90% of an imaging range of a scanning electron microscope (SEM) (specifically, about 30 to 200 times), and at any 5 places in the cross-sectional photograph, the thickness of the fiber base material layer portion was read on a scale and an average value thereof may be used as the thickness of the fiber base material layer.

Thickness of Synthetic Leather

The thickness of synthetic leather was measured in accordance with JIS L-1913 (2010).

Figure 2:
FIG. 2 is a cross-sectional view of the synthetic leather to measure a penetration depth of a resin layer or an adhesive layer into a fiber base material layer.

Penetration Depth of Resin Layer or Adhesive Layer Into Fiber Base Material Layer in Thickness Direction of Synthetic Leather The cross section of the synthetic leather was imaged by a scanning electron microscope (SEM) at a magnification of about 30 to 200 times to clearly observe the cross section, and at 5 places in the cross-sectional photograph, the depth at which the resin layer or the adhesive layer penetrated into the fiber base material layer was read on a scale and the average value thereof was taken as the penetration depth of the resin layer or the adhesive layer into the fiber base material layer in the thickness direction of the synthetic leather. FIG. 2 is a cross-sectional photograph of the synthetic leather, in which 8 shows an interface of a fiber base material layer in a state in which a resin layer is laminated and 9 shows an interface of the resin layer side of the penetrated resin layer, and the penetration depth of the resin layer or the adhesive layer into the fiber base material layer in the thickness direction of the synthetic leather refers to a distance between 8 and 9 in the drawing. When a resin is laminated on a scrim surface, penetration of the resin layer into the fiber base material layer occurs mainly at a portion where the scrim is not exposed to the coated surface of the fiber base material layer. Thus, the penetration depth is measured at a portion where the scrim is not exposed to the coated surface of the fiber base material layer. The penetration depth of the yarn constituting the scrim exposed to the coated surface and the central portion of the yarn is taken as the measurement point.

Tensile Strength of Synthetic Leather

In accordance with ASTM D-751 (2011), when a sample cut into a width of 25.4 mm (1 inch) was stretched at a distance between chucks of 152 mm at a tensile speed of 152 mm/min, a maximum load until the sample was broken was divided by the sample width, and a breaking load per 25.4 mm (1 inch) was defined as a tensile strength (N/25.4 mm). The measurement was performed with N=3 and the average value thereof is shown.

Tensile Elongation of Synthetic Leather

In accordance with ASTM D-751 (2011), when a sample cut into a width of 100 mm was stretched at a distance between chucks of 152 mm at a tensile speed of 152 mm/min, the elongation of the sample at the time of being broken was defined as a ratio (%) obtained by dividing the elongation amount of the sample by the test length of the sample of 152 mm. The measurement was performed with N=3 and the average value thereof is shown.

Tear Strength of Synthetic Leather

In accordance with ASTM D-5733 (1999), tear strength (N) was measured by a trapezoid method and is shown as an average value of N=3.

Peel Strength of Synthetic Leather

In accordance with ASTM D-903 (2017), a resin layer at one end of a sample having a width of 25.4 mm (1 inch) was peeled off from the fiber base material layer and was heat-set on a chuck. In this state, the resin layer and the fiber base material layer were torn off at a speed of 300 mm/min in the direction of 180 degrees. The average value of the peeling load in 127 mm (5 inches) from the position of 25.4 mm (1 inch) from the start of tearing off to 152.4 mm (6 inches) was divided by a sample width, and the peeling load (N/25.4 mm) per 25.4 mm (1 inch) was defined as the peel strength. The measurement was performed with N=3 and the average value thereof is shown.

Wear Durability of Synthetic Leather

In accordance with ASTM D-4157 (2017), a Wyzenbeek abrasion test was performed with N=3 using a load of 1361 gf (3 Lb), a tension of 1814 gf (4 Lb), and No. 10 canvas as a friction cloth. An example where no scratch or peeling of the resin layer was observed on the surface of the synthetic leather after 3000 wear cycles was determined as pass and indicated as A. An example where scratches or peeling of the resin layer was observed was determined as fail and indicated as F.

Seam Strength of Synthetic Leather

In accordance with a seam strength grab method of ASTM D-751 (2011), a breaking strength at the seam portion when two sheets of synthetic leather were sewn and the seam was pulled in the direction of 180 degrees was divided by a sample width, which was expressed as N/25.4 mm. The test was performed with N=3, and the average value thereof is shown.

Flame Retardant Test for Automobile Interior Materials of Synthetic Leather

In accordance with a horizontal combustion test FMVSS No. 302 for automobile interior materials defined in JIS D 1201 (1998), a combustion speed of 4 inches (102 mm)/min or less was determined as pass, a combustion speed of 4 inches (102 mm)/min or less was indicated as B, a combustion speed of 3 inches (76 mm)/min or less was indicated as A, and a failure was indicated as F.

Flame Retardant Test for Aircraft Interior Materials of Synthetic Leather

A 12-second vertical combustion test was performed as specified in 14CFR Part25 Section 25.853(a) and Appendix F to Part 25, Part I, and a sample of a flame time of 15 seconds or less, a drip flame time of 5 seconds or less, and a burn length of 203 mm (8 inches) or less was determined as pass and indicated as A, and other samples were indicated as F.

Flame Retardant Test of Aircraft Seat Cushion

A combustion test was performed in accordance with the gasoline burner test specified in 14 CFR Part 25 Section 25.853 (c) Appendix F Part 25, Part II. FIG. 1 is an illustration to describe a method of assembling a covered article to evaluate flame retardance of the covered article used for a combustion test of an aircraft seat cushion and the combustion test. A soft urethane foam commercially available from FUJI RUBBER SANGYO CO., LTD. was cut into a size of 450 mm×500 mm for a seat surface and a size of 450 mm×630 mm for a rear surface to obtain a urethane foam (seat surface) 1 and a urethane foam (back surface) 2, respectively. A "Velcro (registered trademark)" tape 3 made of polyphenylene sulfide was attached to synthetic leather by sewing with a meta-aramid yarn to prepare a skin material (seat surface) 4 and a skin material (back surface) 5. The skin material (seat surface) 4 and the skin material (back surface) 5 covered the urethane foam (seat surface) 1 and the urethane foam (back surface) 2, respectively, which were fixed to an L-shaped frame (not shown) to assemble a covered article 7. Sample mass was measured before the test. Heating was performed for 2 minutes by a burner 6 from the side surface of the heat-set sample, and the temperature of the burner was set such that the lowest temperature and the highest temperature measured at 5 places in the width direction in the root portion of the burner port were in the range of 1000±20° C. After heating, the burner was separated from the sample and the sample was allowed to stand for 5 minutes. The sample mass was measured after being allowed to stand for 5 minutes. When after the sample was allowed to stand for 5 minutes, flame ignited on the sample was completely extinguished, the burn lengths of the front and rear sides of the back cushion and the bottom and upper portions of the seat cushion were all 432 mm (17 inches) or less, and the mass loss of the sample after the test was 10.0% or less was determined as pass, and among them, the mass loss of 5.0% or less was indicated as A, and the mass loss of more than 5.0% and 10.0% or less was indicated as B. When after the sample was allowed to stand for 5 minutes, flame ignited on the sample was not extinguished, the burn length was more than 432 mm (17 inches), or the mass loss of the sample was more than 10.0% was determined as fail and indicated as F.

Sensory Evaluation of Texture of Cushion Covered with Synthetic Leather

In the same manner as the sample of "Flame retardant test of aircraft seat cushion" described above, a urethane cushion was covered with the synthetic leather and mounted. The touch and seating comfort of the sample were evaluated on a scale of 1 to 5 (1: hard, not comfortable to sit, 5: soft, comfortable to sit) by five people, and the average score is shown.

Fibers Constituting Fiber Base Material Layer
Non-Melting Fiber A 1.7 dtex flameproofed fiber "PYRON" (registered trademark of the United States) manufactured by Zoltek Corporation having a length of 51 mm, a high-temperature shrinkage rate of 1.6%, and a thermal conductivity of 0.033 W/m·K (200 g/m$^2$, measured by manufacturing a 2 mm thick needle punch felt). Number of crimps: 12 (crimps/25 mm), crimp ratio: 12%.

The number of crimps and the crimp ratio were measured in accordance with JIS L 1015 (2010).

Thermoplastic Fiber B-1

"TORCON" (registered trademark) product number 5371 manufactured by Toray Industries, Inc., which is a drawn PPS fiber having a single fiber fineness of 2.2 dtex (diameter: 14 μm) and a cut length of 51 mm, of LOI value: 34, melting point: 284° C., glass transition temperature: 90° C., number of crimps: 14 (crimps/25 mm), and crimp ratio: 18%. The ratio of a sulfur atom in the fiber was 26.2% by mass.

Thermoplastic Fiber B-2

"TORCON" (registered trademark) product number S311 manufactured by Toray Industries, Inc., which is an as-spun PPS fiber having a single fiber fineness of 6.0 dtex (diameter: 23 μm) and a cut length of 51 mm, of LOI value: 34, melting point: 280° C., glass transition temperature: 90° C.,  number of crimps: 16 (crimps/25 mm), and crimp ratio: 22%. The ratio of a sulfur atom in the fiber was 26.1% by mass.

Other Fiber C-1

"TETORON" (registered trademark) product number T9615 manufactured by Toray Industries, Inc., which is a polyethylene terephthalate (PET) fiber having a single fiber fineness of 2.2 dtex (diameter: 14 μm) and a cut length of 51 mm, of LOI value: 22, melting point: 256° C., number of crimps: 16 (crimps/25 mm), and crimp ratio: 17%.

Other Fiber C-2

"ARAWIN" (registered trademark) manufactured by Toray Chemical Korea Co., Ltd., which is a meta-aramid fiber having a single fiber fineness of 1.7 dtex (diameter: 13 μm) and a cut length of 51 mm, of LOI value: 26, melting point: 428° C., high-temperature shrinkage rate: 6.7%, number of crimps: 11 (crimps/25 mm), and crimp ratio: 9%.

Other Fiber C-3

Commercially available common rayon (no flame retardant kneaded therein) having a single fiber fineness of 2.2 dtex (diameter: 14 μm) and a cut length of 51 mm, of LOI value: 17, no melting point, high temperature shrinkage rate: 25.3%, number of crimps: 13 (crimps/25 mm), and crimp ratio of 13%.

Synthetic Resin Constituting Resin Layer
Polyurethane Resin D-1

A commercially available common yellowing-free polycarbonate type polyurethane having a 100% modulus of 2 to 10 MPa was used.

Polyurethane Resin D-2

A commercially available common silicone-modified yellowing-free polycarbonate type polyurethane having a 100% modulus of 5 to 10 MPa was used.

Adhesive Constituting Adhesive Layer

A commercially available common polycarbonate type polyurethane-based adhesive was used.

Flame Retardant

Pekoflam STC (main component: aluminum diethylphosphinate) manufactured by Archroma Japan K.K. was used.

Example 1

Production of Fiber Base Material Layer
Spinning

A drawn PPS fiber was mixed by a fiber opening machine and then further mixed by a cotton mixing machine, and then a sliver was prepared by a carding machine. The mass of the obtained sliver was 30.23 g/5.46 m. Then, the total draft was set to 8 times and the obtained sliver drawn by a drawing machine to obtain a sliver of 28.03 g/5.46 m. Then, the sliver was twisted to 0.55 T/2.54 cm to be drawn 7.4 times by a roving machine to obtain a roving of 323.20 g/5.46 m. Then, the roving was twisted to 16.4 T/2.54 cm by a fine spinning machine to be drawn 30 times as large as the total draft, and twisted to obtain a spun yarn with a cotton count of No. 20. The spun yarn of No. 20 is defined as a weft yarn of the scrim. Furthermore, the obtained spun yarn was upper twisted to 64.7 T/2.54 cm by a double twister to obtain a 20 count 2ply yarn. The 20 count 2ply yarn is used as a warp yarn of the scrim.

Weaving

The obtained spun yarn was woven by plain weaving with 142 warp threads/10 cm and 49 weft threads/10 cm by a rapier loom to obtain a scrim of 103 g/m$^2$.

Production of Fiber Base Material Layer

A drawn PPS fiber and a flameproofed fiber were mixed by a fiber opening machine so that a mass mixing ratio of the drawn PPS fiber and the flameproofed fiber is 20:80 and then further mixed by a cotton mixing machine, and then a web was made by a carding machine. The obtained web was laminated with a crosslap machine, felted with a needle punch machine, and laminated with the scrim obtained by the above method, and the felt and the scrim were further bonded by needle punch to obtain a fiber base material layer having a unit weight of 195 g/m² and a thickness of 1.5 mm.

Production of Synthetic Leather

The fiber base material layer obtained by the above method was dipped in an aqueous polyvinyl alcohol solution having a polymerization degree of 500 and a saponification degree of 92%. The polyvinyl alcohol solid content was 12 parts by mass with respect to 100 parts by mass of the fiber base material layer. Next, a solution containing 15 parts by mass of a flame retardant with respect to 100 parts by mass of the polyurethane resin D-1 was prepared and applied on the fiber base material layer with a knife coater. The applied fiber base material layer was washed with warm water at 60° C. to replace the previously applied polyvinyl alcohol, and then dried in an oven at 120° C. to obtain a wet synthetic leather. A deposition amount of the polyurethane resin calculated from the mass of the dried sample was 230 g/m². Further, the polyurethane resin D-2 dissolved in a solvent was applied on release paper with a comma coater to be 30 g/m², and dried to prepare a film. About 20 g/m² of a mixture of 100 parts by mass of an adhesive and 15 parts by mass of a flame retardant was applied on the film, and the film bonded to the wet synthetic leather and subjected to an aging treatment. The synthetic leather after being bonded to the film had a unit weight of 425 g/m² and a thickness of 1.54 mm. The penetration depth of the resin layer and the adhesive layer into the fiber base material layer calculated from the SEM photograph of the cross section of the obtained synthetic leather was 0.28 mm.

Evaluation of Various Physical Properties

The mechanical properties and wear durability are as shown in Table 5, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 60 mm in the machine direction and 58 mm in the transverse direction. The obtained synthetic leather covered a urethane cushion and a flame retardant test of the sheet cushion was performed and, as a result, the burn length was within the pass range, and the mass loss was as excellent as 4.3%. In addition, the texture of the obtained cushion was soft and good.

Example 2

Production of Fiber Base Material Layer

The same fiber base material layer as that prepared in Example 1 was used as a fiber base material layer.

Production of Synthetic Leather

A synthetic leather was produced in the same manner as in Example 1, except that the unit weight after drying of the polyurethane resin D-1 and the flame retardant constituting the wet synthetic leather was changed to 180 g/m², the non-woven fabric sheet obtained by the above method used as a fiber base material layer, the unit weight of the synthetic leather after being bonded to a film changed to 375 g/m², and the thickness changed to 1.27 mm. The penetration depth of the resin layer and the adhesive layer into the fiber base material layer calculated from the SEM photograph of the cross section of the obtained synthetic leather was 0.26 mm.

Evaluation of Various Physical Properties

The mechanical properties and wear durability are as shown in Table 5, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 59 mm in the machine direction and 52 mm in the transverse direction. The obtained synthetic leather covered a urethane cushion and a flame retardant test of the sheet cushion was performed and, as a result, the burn length was within the pass range, and the mass loss was as excellent as 4.0%. In addition, the texture of the obtained cushion was soft and good.

Example 3

Weaving

A scrim was produced in the same manner as in Example 1, except that the density of the scrim was changed to 142/10 cm of warp and 82/10 cm of weft to obtain a scrim of 134 g/m².

Production of Fiber Base Material Layer

The scrim obtained above was used to obtain a fiber base material layer having a unit weight of 226 g/m² and a thickness of 1.7 mm in the same manner as in Example 1.

Production of Synthetic Leather

A synthetic leather was produced in the same manner as in Example 1, except that the unit weight after drying of the polyurethane resin D-1 and the flame retardant constituting the wet synthetic leather was changed to 182 g/m², the non-woven fabric sheet obtained by the above method used as a fiber base material layer, the unit weight of the synthetic leather after being bonded to a film changed to 408 g/m², and the thickness changed to 1.26 mm. The penetration depth of the resin layer and the adhesive layer into the fiber base material layer calculated from the SEM photograph of the cross section of the obtained synthetic leather was 0.26 mm.

Evaluation of Various Physical Properties

The mechanical properties and wear durability are as shown in Table 5, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 56 mm in the machine direction and 57 mm in the transverse direction. The obtained synthetic leather covered a urethane cushion and a flame retardant test of the sheet cushion was performed and, as a result, the burn length was within the pass range, and the mass loss was as excellent as 4.4%. In addition, the texture of the obtained cushion was soft and good.

Example 4

Production of Fiber Base Material Layer

The same scrim as in Example 1 was used. As for the felt portion, the mass ratio of the drawn PPS fiber and the flameproofed fiber was changed to 25:75 to produce a felt in the same manner as in Example 1, and the felt was bonded to the scrim. The unit weight of the fiber base material layer after bonding the scrim and the felt was 204 g/m², and the thickness was 1.6 mm.

Production of Synthetic Leather

A synthetic leather was produced in the same manner as in Example 1, except that the unit weight after drying of the polyurethane resin D-1 and the flame retardant constituting the wet synthetic leather was changed to 235 g/m$^2$, the non-woven fabric sheet obtained by the above method used as a fiber base material layer, the unit weight of the synthetic leather after being bonded to a film changed to 439 g/m$^2$, and the thickness changed to 1.54 mm. The penetration depth of the resin layer and the adhesive layer into the fiber base material layer calculated from the SEM photograph of the cross section of the obtained synthetic leather was 0.26 mm.

Evaluation of Various Physical Properties

The mechanical properties and wear durability are as shown in Table 5, and sufficient physical properties as a synthetic leather were satisfied. In addition, self-extinguishing in a 38 mm marked line was observed in the flame retardant test for automobile interior materials, both afterflame and drip combustion were not observed in the flame retardant test for aircraft interior materials, and favorable results were obtained with a burn length of 67 mm in the machine direction and 66 mm in the transverse direction. The obtained synthetic leather covered a urethane cushion and a flame retardant test of the sheet cushion was performed and, as a result, the burn length was within the pass range, and the mass loss was 9.2%, which was within the pass range. In addition, the texture of the obtained cushion was soft and good.

Example 5

Production of Fiber Base Material Layer

The mass ratio of each fiber of the warp and the weft constituting the scrim was changed to drawn PPS fiber 30 to flameproofed fiber 70 to obtain a 20 yarn count spun yarn and a 20 yarn count 2 ply yarn in the same manner as in Example 1. The woven fabric structure of the scrim was the same as that in Example 1 to obtain a scrim having a unit weight of 109 g/m$^2$.

As for the felt portion, a web was produced at the mass ratio of drawn PPS fiber 20 to flameproofed fiber 80 in the same manner as in Example 1, and bonded to the scrim to form a fiber base material layer. The obtained fiber base material layer had a unit weight of 201 g/m$^2$ and a thickness of 1.6 mm.

Production of Synthetic Leather

A synthetic leather was produced in the same manner as in Example 1, except that the unit weight after drying of the polyurethane resin D-1 and the flame retardant constituting the wet synthetic leather was changed to 220 g/m$^2$, the non-woven fabric sheet obtained by the above method used as a fiber base material layer, the unit weight of the synthetic leather after being bonded to a film changed to 421 g/m$^2$, and the thickness changed to 1.53 mm. The penetration depth of the resin layer and the adhesive layer into the fiber base material layer calculated from the SEM photograph of the cross section of the obtained synthetic leather was 0.27 mm.

Evaluation of Various Physical Properties

The mechanical properties and wear durability are as shown in Table 6, and sufficient physical properties as a synthetic leather were satisfied. In addition, self-extinguishing in a 38 mm marked line was observed in the flame retardant test for automobile interior materials, both afterflame and drip combustion were not observed in the flame retardant test for aircraft interior materials, and favorable results were obtained with a burn length of 51 mm in the machine direction and 50 mm in the transverse direction. The obtained synthetic leather covered a urethane cushion and a flame retardant test of the sheet cushion was performed and, as a result, the burn length was within the pass range, and the mass loss was 8.8%, which was within the pass range. In addition, the texture of the obtained cushion was soft and good.

Example 6

Production of Fiber Base Material Layer

The mass ratio of each fiber of the warp and the weft constituting the scrim was changed to drawn PPS fiber 70 to flameproofed fiber 30 to obtain a 20 yarn count spun yarn and a 20 yarn count 2 ply yarn in the same manner as in Example 1. The woven fabric structure of the scrim was the same as that in Example 1 to obtain a scrim having a unit weight of 109 g/m$^2$.

As for the felt portion, a web was produced at a mass ratio of drawn PPS fiber 50 to flameproofed fiber 50 in the same manner as in Example 1, and bonded to the scrim to form a fiber base material layer. The obtained fiber base material layer had a unit weight of 204 g/m$^2$ and a thickness of 1.6 mm.

Production of Synthetic Leather

A synthetic leather was produced in the same manner as in Example 1, except that the unit weight after drying of the polyurethane resin D-1 and the flame retardant constituting the wet synthetic leather was changed to 223 g/m$^2$, the non-woven fabric sheet obtained by the above method used as a fiber base material layer, the unit weight of the synthetic leather after being bonded to a film changed to 425 g/m$^2$, and the thickness changed to 1.54 mm. The penetration depth of the resin layer and the adhesive layer into the fiber base material layer calculated from the SEM photograph of the cross section of the obtained synthetic leather was 0.25 mm.

Evaluation of Various Physical Properties

The mechanical properties and wear durability are as shown in Table 6, and sufficient physical properties as a synthetic leather were satisfied. In addition, self-extinguishing in a 38 mm marked line was observed in the flame retardant test for automobile interior materials, both afterflame and drip combustion were not observed in the flame retardant test for aircraft interior materials, and favorable results were obtained with a burn length of 69 mm in the machine direction and 70 mm in the transverse direction. The obtained synthetic leather covered a urethane cushion and a flame retardant test of the sheet cushion was performed and, as a result, the burn length was within the pass range, and the mass loss was 8.9%, which was within the pass range. In addition, the texture of the obtained cushion was soft and good.

Example 7

Production of Fiber Base Material Layer

The same fiber base material layer as in Example 1 was used.

Production of Synthetic Leather

A synthetic leather was produced in the same manner as in Example 1, except that the unit weight after drying of the polyurethane resin D-1 and the flame retardant constituting the wet synthetic leather was changed to 350 g/m$^2$, the non-woven fabric sheet obtained by the above method used as a fiber base material layer, the unit weight of the synthetic leather after being bonded to a film changed to 545 g/m$^2$, and the thickness changed to 1.63 mm. The penetration depth of the resin layer and the adhesive layer into the fiber base material layer calculated from the SEM photograph of the cross section of the obtained synthetic leather was 0.26 mm.

Evaluation of Various Physical Properties

The mechanical properties and wear durability are as shown in Table 6, and sufficient physical properties as a synthetic leather were satisfied. In addition, self-extinguishing in a 38 mm marked line was observed in the flame retardant test for automobile interior materials, both afterflame and drip combustion were not observed in the flame retardant test for aircraft interior materials, and favorable results were obtained with a burn length of 63 mm in the machine direction and 69 mm in the transverse direction. The obtained synthetic leather covered a urethane cushion and a flame retardant test of the sheet cushion was performed and, as a result, the burn length was within the pass range, and the mass loss was 9.7%, which was within the pass range. In addition, the texture of the obtained cushion was soft and good.

Example 8

Production of Fiber Base Material Layer

The PPS fiber used for the scrim constituting the fiber base material layer was changed from a drawn PPS fiber to an as-spun PPS fiber to produce a scrim in the same manner as in Example 1, and bonded to a felt. After the felt and the scrim were bonded, the scrim surface was smoothed by placing the scrim surface on two S-shaped rolls at 180° C.

Production of Synthetic Leather

A synthetic leather was produced in the same manner as in Example 1, except that the unit weight after drying of the polyurethane resin D-1 and the flame retardant constituting the wet synthetic leather was changed to 232 g/m$^2$, the non-woven fabric sheet obtained by the above method used as a fiber base material layer, the unit weight of the synthetic leather after being bonded to a film changed to 427 g/m$^2$, and the thickness changed to 1.53 mm. The penetration depth of the resin layer and the adhesive layer into the fiber base material layer calculated from the SEM photograph of the cross section of the obtained synthetic leather was 0.03 mm.

Evaluation of Various Physical Properties

The mechanical properties and wear durability are as shown in Table 6 and sufficient physical properties as a synthetic leather were satisfied, but peel strength was lower than that of Example 1. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 69 mm in the machine direction and 64 mm in the transverse direction. The obtained synthetic leather covered a urethane cushion and a flame retardant test of the sheet cushion was performed and, as a result, the burn length was within the pass range, and the mass loss was 5.6%, which was within the pass range. In addition, the texture of the obtained cushion was soft and good.

Example 9

Production of Fiber Base Material Layer

The same fiber base material layer as in Example 1 was used.

Production of Synthetic Leather

A synthetic leather was produced in the same manner as in Example 1, except that the unit weight after drying of the polyurethane resin D-1 and the flame retardant constituting the wet synthetic leather was changed to 222 g/m$^2$, the non-woven fabric sheet obtained by the above method used as a fiber base material layer, the unit weight of the synthetic leather after being bonded to a film changed to 417 g/m$^2$, and the thickness changed to 1.52 mm. The penetration depth of the resin layer and the adhesive layer into the fiber base material layer calculated from the SEM photograph of the cross section of the obtained synthetic leather was 0.51 mm.

Evaluation of Various Physical Properties

The mechanical properties and wear durability are as shown in Table 7, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 62 mm in the machine direction and 65 mm in the transverse direction. The obtained synthetic leather covered a urethane cushion and a flame retardant test of the sheet cushion was performed and, as a result, the burn length was within the pass range, and the mass loss was 5.8%, which was within the pass range. The texture of the obtained cushion was evaluated as slightly hard with an average of 3.4 points.

Example 10

Weaving

A scrim was produced in the same manner as in Example 1, except that the density of the scrim was changed to 172/10 cm of warp and 85/10 cm of weft to obtain a scrim of 164 g/m$^2$.

Production of Fiber Base Material Layer

The scrim obtained above was used to obtain a fiber base material layer having a unit weight of 224 g/m$^2$ and a thickness of 1.6 mm in the same manner as in Example 1.

Production of Synthetic Leather

A synthetic leather was produced in the same manner as in Example 1, except that the unit weight after drying of the polyurethane resin D-1 and the flame retardant constituting the wet synthetic leather was changed to 225 g/m$^2$, the non-woven fabric sheet obtained by the above method used as a fiber base material layer, the unit weight of the synthetic leather after being bonded to a film changed to 449 g/m$^2$, and the thickness changed to 1.49 mm. The penetration depth of the resin layer and the adhesive layer into the fiber base material layer calculated from the SEM photograph of the cross section of the obtained synthetic leather was 0.27 mm.

Evaluation of Various Physical Properties

The mechanical properties and wear durability are as shown in Table 7, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 62 mm in the machine direction and 54 mm in the transverse direction. The obtained synthetic leather covered a urethane cushion and a flame retardant test of the sheet cushion was performed and, as a result, the burn length was within the pass range, and the mass loss was as excellent as 4.2%. The texture of the obtained cushion was evaluated as slightly hard with an average of 3.6 points.

Example 11

Weaving

A scrim was produced in the same manner as in Example 1, except that the density of the scrim was changed to 55/10 cm of warp and 35/10 cm of weft to obtain a scrim of 40 g/m².

Production of Fiber Base Material Layer

The scrim obtained above was used to obtain a fiber base material layer having a unit weight of 205 g/m² and a thickness of 1.7 mm in the same manner as in Example 1.

Production of Synthetic Leather

A synthetic leather was produced in the same manner as in Example 1, except that the unit weight after drying of the polyurethane resin D-1 and the flame retardant constituting the wet synthetic leather was changed to 224 g/m², the non-woven fabric sheet obtained by the above method used as a fiber base material layer, the unit weight of the synthetic leather after being bonded to a film changed to 429 g/m², and the thickness changed to 1.55 mm. The penetration depth of the resin layer and the adhesive layer into the fiber base material layer calculated from the SEM photograph of the cross section of the obtained synthetic leather was 0.27 mm.

Evaluation of Various Physical Properties

The mechanical properties and wear durability are as shown in Table 7 and sufficient physical properties as a synthetic leather were satisfied, but due to the low density of the scrim, the mechanical properties were poor as compared with Example 1. Self-extinguishing in a 38 mm marked line was observed in the flame retardant test for automobile interior materials, both after-flame and drip combustion were not observed in the flame retardant test for aircraft interior materials, and favorable results were obtained with a burn length of 59 mm in the machine direction and 58 mm in the transverse direction. The obtained synthetic leather covered a urethane cushion and a flame retardant test of the sheet cushion was performed and, as a result, the burn length was within the pass range, and the mass loss was as excellent as 4.9%. In addition, the texture of the obtained cushion was soft and good.

Example 12

Production of Fiber Base Material Layer

The material mass ratio of the scrim part was changed to drawn PPS fiber 75 to PET 25 to obtain a scrim having a yarn density of 105 g/m² in the same manner as in Example 1. A PET fiber was used for the felt portion instead of the drawn PPS fiber, and the mass ratio of the raw materials was flameproofed fiber 80 to PET fiber 20. The scrim and the felt were bonded in the same manner as in Example 1 to obtain a fiber base material layer having a unit weight of 205 g/m² and a thickness of 1.5 mm.

Production of Synthetic Leather

A synthetic leather was produced in the same manner as in Example 1, except that the unit weight after drying of the polyurethane resin D-1 and the flame retardant constituting the wet synthetic leather was changed to 224 g/m², the non-woven fabric sheet obtained by the above method used as a fiber base material layer, the unit weight of the synthetic leather after being bonded to a film changed to 429 g/m², and the thickness changed to 1.53 mm. The penetration depth of the resin layer and the adhesive layer into the fiber base material layer calculated from the SEM photograph of the cross section of the obtained synthetic leather was 0.27 mm.

Evaluation of Various Physical Properties

The mechanical properties and wear durability are as shown in Table 7, and sufficient physical properties as a synthetic leather were satisfied. In addition, in the flame retardant test for automobile interior materials, the synthetic leather was burned beyond the 38 mm marked line, but the combustion speed was 69 mm/min, which was within the pass range. In the flame retardant test for aircraft interior materials, the synthetic leather with after-flame of 1.3 seconds in the machine direction and 1.0 second in the transverse direction, a drip combustion of 0.9 seconds in the machine direction and 1.0 second in the transverse direction, and a burn length of 100 mm in the machine direction and 95 mm in the transverse direction was within the pass range. The obtained synthetic leather covered a urethane cushion and a flame retardant test of the sheet cushion was performed and, as a result, the burn length was within the pass range, and the mass loss was 9.8%, which was within the pass range. In addition, the texture of the obtained cushion was soft and good.

Comparative Example 1

Production of Fiber Base Material Layer

Only a meta-aramid fiber was used and the density of the scrim part was the same as that in Example 1 to obtain a scrim having a unit weight of 107 g/m². A fiber base material layer having a unit weight of 197 g/m² and a thickness of 1.6 mm was obtained by using only a meta-aramid fiber was used for the felt portion and bonding the felt portion and the scrim part in the same manner as in Example 1.

Production of Synthetic Leather

A synthetic leather was produced in the same manner as in Example 1, except that the unit weight after drying of the polyurethane resin D-1 and the flame retardant constituting the wet synthetic leather was changed to 230 g/m², the non-woven fabric sheet obtained by the above method used as a fiber base material layer, the unit weight of the synthetic leather after being bonded to a film changed to 427 g/m², and the thickness changed to 1.55 mm. The penetration depth of the resin layer and the adhesive layer into the fiber base material layer calculated from the SEM photograph of the cross section of the obtained synthetic leather was 0.26 mm.

Evaluation of Various Physical Properties

The mechanical properties and wear durability are as shown in Table 8, and sufficient physical properties as a synthetic leather were satisfied. In addition, self-extinguishing in a 38 mm marked line was observed in the flame retardant test for automobile interior materials, both after-flame and drip combustion were not observed in the flame retardant test for aircraft interior materials, and favorable results were obtained with a burn length of 5 mm in the machine direction and 54 mm in the transverse direction. The obtained synthetic leather covered a urethane cushion and a flame retardant test of the sheet cushion was performed and, as a result, the burn length was within the pass range, but the mass loss was 10.7%, which failed. The texture of the obtained cushion was soft and good.

Comparative Example 2

Production of Fiber Base Material Layer

A PET fiber and a rayon fiber were used as the fibers at the mass ratio of the PET fiber to the rayon fiber of 65:35 to produce a spun yarn in the same manner as in Example 1, and the density of the scrim part was the same as that in Example 1 to obtain a scrim having a unit weight of 112 g/m². As for the felt portion also, a PET fiber and a rayon fiber were used at the mass ratio of the PET fiber and the rayon fiber of 65:35 to produce a felt and the felt portion and the scrim part were bonded in the same manner as in Example 1 to obtain a fiber base material layer having a unit weight of 207 g/m² and a thickness of 1.6 mm.

Production of Synthetic Leather

A synthetic leather was produced in the same manner as in Example 1, except that the unit weight after drying of the polyurethane resin D-1 and the flame retardant constituting the wet synthetic leather was changed to 236 g/m², the non-woven fabric sheet obtained by the above method used as a fiber base material layer, the unit weight of the synthetic leather after being bonded to a film changed to 443 g/m², and the thickness changed to 1.52 mm. The penetration depth of the resin layer and the adhesive layer into the fiber base material layer calculated from the SEM photograph of the cross section of the obtained synthetic leather was 0.28 mm.

Evaluation of Various Physical Properties

The mechanical properties and wear durability are as shown in Table 8, and sufficient physical properties as a synthetic leather were satisfied. In addition, in the flame retardant test for automobile interior materials, the synthetic leather was burned beyond the 38 mm marked line, but the combustion speed was 93 mm/min, which was within the pass range. In the flame retardant test for aircraft interior materials, the synthetic leather with after-flame of 3.2 seconds in the machine direction and 3.2 second in the transverse direction, a drip combustion of 1.9 seconds in the machine direction and 1.8 seconds in the transverse direction, and a burn length of 169 mm in the machine direction and 170 mm in the transverse direction was within the pass range. The obtained synthetic leather covered a urethane cushion and a flame retardant test of the sheet cushion was performed and, as a result, the burn length failed and the mass loss was 26.7%, which failed. The texture of the obtained cushion was soft and good.

Reference Example 1

Production of Fiber Base Material Layer

The same fiber base material layer as in Example 1 was used.

Production of Synthetic Leather

A surface on which a polyurethane resin D-1 and a flame retardant constituting a wet synthetic leather are applied was changed to a felt surface of the fiber base material layer, a unit weight after drying the polyurethane resin D-1 and the flame retardant was 222 g/m², a unit weight of the synthetic leather after being bonded to a film was 417 g/m², and a thickness was 1.52 mm, thereby producing a synthetic leather in the same manner as in Example 1. The penetration depth of the resin layer and the adhesive layer into the fiber base material layer calculated from the SEM photograph of the cross section of the obtained synthetic leather was 0.33 mm.

Evaluation of Various Physical Properties

The mechanical properties and wear durability were as shown in Table 8 and sufficient physical properties were satisfied with the synthetic leather, but peel strength was 20.6 N/25.4 mm in the machine direction and 19.6 N/25.4 mm in the transverse direction, which was inferior to that of Example 1. Self-extinguishing in a 38 mm marked line was observed in the flame retardant test for automobile interior materials, both after-flame and drip combustion were not observed in the flame retardant test for aircraft interior materials, and favorable results were obtained with a burn length of 59 mm in the machine direction and 63 mm in the transverse direction. The obtained synthetic leather covered a urethane cushion and a flame retardant test of the sheet cushion was performed and, as a result, the burn length was within the pass range, and the mass loss was 6.6%, which was within the pass range. The texture of the obtained cushion was soft and good.

Reference Example 2

Production of Fiber Base Material Layer

The mass ratio of each fiber of the warp and the weft constituting the scrim was changed to drawn PPS fiber 60 to flameproofed fiber 40 to obtain a 20 yarn count spun yarn and a 20 yarn count 2 ply yarn in the same manner as in Example 1. The woven fabric structure of the scrim was a 20 yarn count warp spun yarn and a 20 yarn count weft 2 ply yarn, and a plain weave with 42/2.54 cm warp and 45/2.54 cm weft was woven by a rapier loom. The obtained scrim was scoured/heat-set by a known method, and then one surface napped. The density of the scrim after napping was 54/2.54 cm warp and 47/2.54 cm weft. The unit weight was 200 g/m² and the thickness was 1.0 mm.

Production of Synthetic Leather

A polyurethane resin D-1 constituting a wet synthetic leather and a flame retardant were applied to the napped surface of the scrim. A unit weight after drying the polyurethane resin D-1 and the flame retardant was 220 g/m², a unit weight of the synthetic leather after being bonded to a film was 420 g/m², and a thickness was 1.49 mm, thereby producing a synthetic leather in the same manner as in Example 1. The penetration depth of the resin layer and the adhesive layer into the fiber base material layer calculated from the SEM photograph of the cross section of the obtained synthetic leather was 0.31 mm.

Evaluation of Various Physical Properties

The mechanical properties and wear durability were as shown in Table 8 and sufficient physical properties were satisfied with the synthetic leather, but peel strength was 21.6 N/25.4 mm in the machine direction and 23.5 N/25.4 mm in the transverse direction, which was inferior to that of Example 1. Self-extinguishing in a 38 mm marked line was observed in the flame retardant test for automobile interior materials, both after-flame and drip combustion were not observed in the flame retardant test for aircraft interior materials, and favorable results were obtained with a burn length of 53 mm in the machine direction and 59 mm in the transverse direction. The obtained synthetic leather covered a urethane cushion and a flame retardant test of the sheet cushion was performed and, as a result, the burn length was within the pass range, and the mass loss was 5.3%, which was within the pass range. The texture of the obtained cushion was evaluated as slightly hard with an average of 3.6 points.

TABLE 1

|  |  |  | Example 1 | Example 2 | Example 3 | Example 4 |
|---|---|---|---|---|---|---|
| Fiber base material layer | Flame retardant Layer (Felt portion) | Non-melting fiber A | Flameproofed fiber 80% by mass | Flameproofed fiber 80% by mass | Flameproofed fiber 80% by mass | Flameproofed fiber 25% by mass |
|  |  | Thermoplastic fiber B | Drawn PPS fiber 20% by mass | Drawn PPS fiber 20% by mass | Drawn PPS fiber 20% by mass | Drawn PPS fiber 75% by mass |

TABLE 1-continued

|  |  |  | Example 1 | Example 2 | Example 3 | Example 4 |
|---|---|---|---|---|---|---|
|  |  | Other fiber C | — | — | — | — |
|  |  | Unit weight (g/m²) | 92 | 92 | 92 | 101 |
|  | Scrim layer | Non-melting fiber A | — | — | — | — |
|  |  | Thermoplastic fiber B | Drawn PPS fiber 100% by mass | Drawn PPS fiber 100% by mass | Drawn PPS fiber 100% by mass | Drawn PPS fiber 100% by mass |
|  |  | Other fiber C | — | — | — | — |
|  |  | Unit weight (g/m²) | 103 | 103 | 134 | 103 |
|  |  | Mixing ratio of fibers | Non-melting fiber A 37.7% by mass Thermoplastic fiber B 62.3% by mass Other fiber C 0.0% by mass | Non-melting fiber A 37.7% by mass Thermoplastic fiber B 62.3% by mass Other fiber C 0.0% by mass | Non-melting fiber A 32.5% by mass Thermoplastic fiber B 77.5% by mass Other fiber C 0.0% by mass | Non-melting fiber A 12.3% by mass Thermoplastic fiber B 87.7% by mass Other fiber C 0.0% by mass |
|  |  | Thickness Before lamination of resin layer (mm) | 1.5 | 1.5 | 1.7 | 1.6 |
|  |  | Unit weight (g/m²) | 195 | 195 | 226 | 204 |
| Resin layer/ adhesive layer | Coated surface |  | Scrim surface | Scrim surface | Scrim surface | Scrim surface |
|  | First resin layer | Resin | Polyurethane resin D-1 100 parts by mass | Polyurethane resin D-1 100 parts by mass | Polyurethane resin D-1 100 parts by mass | Polyurethane resin D-1 100 parts by mass |
|  |  | Flame retardant | Aluminum diethyl-phosphinate 15 parts by mass | Aluminum diethyl-phosphinate 15 parts by mass | Aluminum diethyl-phosphinate 15 parts by mass | Aluminum diethyl-phosphinate 15 parts by mass |
|  | Adhesive layer | Adhesive | Polycarbonate type polyurethane 100 parts by mass | Polycarbonate type polyurethane 100 parts by mass | Polycarbonate type polyurethane 100 parts by mass | Polycarbonate type polyurethane 100 parts by mass |
|  |  | Flame retardant | Aluminum diethyl-phosphinate 10 parts by mass | Aluminum diethyl-phosphinate 10 parts by mass | Aluminum diethyl-phosphinate 10 parts by mass | Aluminum diethyl-phosphinate 10 parts by mass |
|  | Second resin layer | Resin | Polyurethane resin D-2 | Polyurethane resin D-2 | Polyurethane resin D-2 | Polyurethane resin D-2 |
|  |  | Impregnation depth of resin layer/ adhesive layer into fiber base material layer (mm) | 0.28 | 0.26 | 0.26 | 0.26 |
|  |  | Unit weight of resin layer/ adhesive layer (g/m²) | 230 | 180 | 182 | 235 |

TABLE 2

|  |  |  | Example 5 | Example 6 | Example 7 | Example 8 |
|---|---|---|---|---|---|---|
| Fiber base material layer | Flame retardant layer (Felt portion) | Non-melting fiber A | Flameproofed fiber 80% by mass | Flameproofed fiber 50% by mass | Flameproofed fiber 80% by mass | Flameproofed fiber 80% by mass |
|  |  | Thermoplastic fiber B | Drawn PPS fiber 20% by mass | Drawn PPS fiber 50% by mass | Drawn PPS fiber 20% by mass | Drawn PPS fiber 20% by mass |
|  |  | Other fiber C | — | — | — | — |
|  |  | Unit weight (g/m²) | 92 | 95 | 92 | 92 |
|  | Scrim layer | Non-melting fiber A | Flameproofed fiber 70% by mass | Flameproofed fiber 30% by mass | — | — |

TABLE 2-continued

|  |  |  | Example 5 | Example 6 | Example 7 | Example 8 |
|---|---|---|---|---|---|---|
|  |  | Thermoplastic fiber B | Drawn PPS fiber 30% by mass | Drawn PPS fiber 70% by mass | Drawn PPS fiber 100% by mass | As-spun PPS fiber 100% by mass |
|  |  | Other fiber C | — | — | — | — |
|  |  | Unit weight (g/m$^2$) | 109 | 109 | 103 | 103 |
|  |  | Mixing ratio of fibers | Non-melting fiber A 74.5% by mass Thermoplastic fiber B 25.5% by mass Other fiber C 0.0% by mass | Non-melting fiber A 39.3% by mass Thermoplastic fiber B 60.7% by mass Other fiber C 0.0% by mass | Non-melting fiber A 37.7% by mass Thermoplastic fiber B 62.3% by mass Other fiber C 0.0% by mass | Non-melting fiber A 37.7% by mass Thermoplastic fiber B 62.3% by mass Other fiber C 0.0% by mass |
|  |  | Thickness before lamination of resin layer (mm) | 1.6 | 1.6 | 1.6 | 1.6 |
|  |  | Unit weight (g/m$^2$) | 201 | 204 | 195 | 195 |
| Resin layer/ adhesive layer | Coated surface |  | Scrim surface | Scrim surface | Scrim surface | Scrim surface |
|  | First resin layer | Resin | Polyurethane resin D-1 100 parts by mass | Polyurethane resin D-1 100 parts by mass | Polyurethane resin D-1 100 parts by mass | Polyurethane resin D-1 100 parts by mass |
|  |  | Flame retardant | Aluminum diethyl-phosphinate 15 parts by mass | Aluminum diethyl-phosphinate 15 parts by mass | Aluminum diethyl-phosphinate 15 parts by mass | Aluminum diethyl-phosphinate 15 parts by mass |
|  | Adhesive Layer | Adhesive | Polycarbonate type polyurethane 100 parts by mass | Polycarbonate type polyurethane 100 parts by mass | Polycarbonate type polyurethane 100 parts by mass | Polycarbonate type polyurethane 100 parts by mass |
|  |  | Flame retardant | Aluminum diethyl-phosphinate 10 parts by mass | Aluminum diethyl-phosphinate 10 parts by mass | Aluminum diethyl-phosphinate 10 parts by mass | Aluminum diethyl-phosphinate 10 parts by mass |
|  | Second resin layer | Resin | Polyurethane resin D-2 | Polyurethane resin D-2 | Polyurethane resin D-2 | Polyurethane resin D-2 |
|  |  | Impregnation depth of resin layer/ adhesive layer into fiber base material layer (mm) | 0.27 | 0.25 | 0.26 | 0.03 |
|  |  | Unit weight of resin layer/ adhesive layer (g/m$^2$) | 220 | 223 | 350 | 232 |

TABLE 3

|  |  |  | Example 9 | Example 10 | Example 11 | Example 12 |
|---|---|---|---|---|---|---|
| Fiber base material layer | Flame retardant layer (Felt portion) | Non-melting fiber A | Flameproofed fiber 80% by mass | Flameproofed fiber 80% by mass | Flameproofed fiber 80% by mass | Flameproofed fiber 80% by mass |
|  |  | Thermoplastic fiber B | Drawn PPS fiber 20% by mass | Drawn PPS fiber 20% by mass | Drawn PPS fiber 20% by mass | — |
|  |  | Other fiber C | — | — | — | PET fiber 20% by mass |
|  |  | Unit weight (g/m$^2$) | 92 | 60 | 165 | 100 |
|  | Scrim layer | Non-melting fiber A | — | — | — | — |
|  |  | Thermoplastic fiber B | Drawn PPS fiber 100% by mass | Drawn PPS fiber 100% by mass | Drawn PPS fiber 100% by mass | Drawn PPS fiber 75% by mass |
|  |  | Other fiber C | — | — | — | PET fiber 25% by mass |

TABLE 3-continued

|  |  |  | Example 9 | Example 10 | Example 11 | Example 12 |
|---|---|---|---|---|---|---|
|  |  | Unit weight (g/m²) | 103 | 164 | 40 | 105 |
|  |  | Mixing ratio of fibers | Non-melting fiber A 37.7% by mass Thermoplastic fiber B 62.3% by mass Other fiber C 0.0% by mass | Non-melting fiber A 21.1% by mass Thermoplastic fiber B 78.9% by mass Other fiber C 0.0% by mass | Non-melting fiber A 64.3% by mass Thermoplastic fiber B 35.7% by mass Other fiber C 0.0% by mass | Non-melting fiber A 39.0% by mass Thermoplastic fiber B 38.4% by mass Other fiber C 22.6% by mass |
|  |  | Thickness before lamination of resin layer (mm) | 1.6 | 1.6 | 1.7 | 1.5 |
|  |  | Unit weight (g/m²) | 195 | 224 | 205 | 205 |
| Resin layer/ adhesive layer | Coated surface |  | Scrim surface | Scrim surface | Scrim surface | Scrim surface |
|  | First resin layer | Resin | Polyurethane resin D-1 100 parts by mass | Polyurethane resin D-1 100 parts by mass | Polyurethane resin D-1 100 parts by mass | Polyurethane resin D-1 100 parts by mass |
|  |  | Flame retardant | Aluminum diethyl-phosphinate 15 parts by mass | Aluminum diethyl-phosphinate 15 parts by mass | Aluminum diethyl-phosphinate 15 parts by mass | Aluminum diethyl-phosphinate 15 parts by mass |
|  | Adhesive Layer | Adhesive | Polycarbonate type polyurethane 100 parts by mass | Polycarbonate type polyurethane 100 parts by mass | Polycarbonate type polyurethane 100 parts by mass | Polycarbonate type polyurethane 100 parts by mass |
|  |  | Flame retardant | Aluminum diethyl-phosphinate 10 parts by mass | Aluminum diethyl-phosphinate 10 parts by mass | Aluminum diethyl-phosphinate 10 parts by mass | Aluminum diethyl-phosphinate 10 parts by mass |
|  | Second resin layer | Resin | Polyurethane resin D-2 | Polyurethane resin D-2 | Polymethane resin D-2 | Polyurethane resin D-2 |
|  |  | Impregnation depth of resin layer/ adhesive layer into fiber base material layer (mm) | 0.51 | 0.27 | 0.27 | 0.27 |
|  |  | Unit weight of resin layer/ adhesive layer (g/m²) | 222 | 225 | 224 | 224 |

TABLE 4

|  |  |  | Comparative Example 1 | Comparative Example 2 | Reference Example 1 | Reference Example 2 |
|---|---|---|---|---|---|---|
| Fiber base material layer | Flame retardant layer (Felt portion) | Non-melting fiber A | — | — | Flameproofed fiber 80% by mass | — |
|  |  | Thermoplastic fiber B | — | — | Drawn PPS fiber 20% by mass | — |
|  |  | Other fiber C | Meta-aramid fiber 100% by mass | 65% by mass of PET fiber/ 35% by mass of rayon | — | — |
|  |  | Unit weight (g/m²) | 90 | 95 | 92 | — |
|  | Scrim layer | Non-melting fiber A | — | — | — | Flameproofed fiber 40% by mass |
|  |  | Thermoplastic fiber B | — | — | Drawn PPS fiber 100% by mass | Drawn PPS fiber 60% by mass |

TABLE 4-continued

|  |  |  | Comparative Example 1 | Comparative Example 2 | Reference Example 1 | Reference Example 2 |
|---|---|---|---|---|---|---|
|  |  | Other fiber C | Meta-aramid fiber 100% by mass | 65% by mass of PET fiber/ 35% by mass of rayon | — | — |
|  |  | Unit weight (g/m²) | 107 | 112 | 103 | 200 |
|  |  | Mixing ratio of fibers | Non-melting fiber A 0.0% by mass Thermoplastic fiber B 0.0% by mass Other fiber C 100.0% by mass | Non-melting fiber A 0.0% by mass Thermoplastic fiber B 0.0% by mass Other fiber C 100.0% by mass | Non-melting fiber A 37.7% by mass Thermoplastic fiber B 62.3% by mass Other fiber C 0.0% by mass | Non-melting fiber A 40.0% by mass Thermoplastic fiber B 60.0% by mass Other fiber C 0.0% by mass |
|  |  | Thickness before lamination of resin layer (mm) | 1.6 | 1.6 | 1.5 | 1.0 |
|  |  | Unit weight (g/m²) | 197 | 207 | 195 | 200 |
| Resin layer/ adhesive layer | Coated surface |  | Scrim surface | Scrim surface | Felt surface | Fabric napped surface |
|  | First resin layer | Resin | Polyurethane resin D-1 100 parts by mass | Polyurethane resin D-1 100 parts by mass | Polyurethane resin D-1 100 parts by mass | Polyurethane resin D-1 100 parts by mass |
|  |  | Flame retardant | Aluminum diethyl- phosphinate 15 parts by mass | Aluminum diethyl- phosphinate 15 parts by mass | Aluminum diethyl- phosphinate 15 parts by mass | Aluminum diethyl- phosphinate 15 parts by mass |
|  | Adhesive layer | Adhesive | Polycarbonate type polyurethane 100 parts by mass | Polycarbonate type polyurethane 100 parts by mass | Polycarbonate type polyurethane 100 parts by mass | Polycarbonate type polyurethane 100 parts by mass |
|  |  | Flame retardant | Aluminum diethyl- phosphinate 10 parts by mass | Aluminum diethyl- phosphinate 10 parts by mass | Aluminum diethyl- phosphinate 10 parts by mass | Aluminum diethyl- phosphinate 10 parts by mass |
|  | Second resin layer | Resin | Polyurethane resin D-2 | Polyurethane resin D-2 | Polyurethane resin D-2 | Polyurethane resin D-2 |
|  |  | Impregnation depth of resin layer/ adhesive layer into fiber base material layer (mm) | 0.26 | 0.28 | 0.33 | 0.31 |
|  |  | Unit weight of resin layer/ adhesive layer (g/m²) | 230 | 236 | 222 | 220 |

TABLE 5

|  |  | Example 1 | Example 2 | Example 3 | Example 4 |
|---|---|---|---|---|---|
| Synthetic leather | Thickness (mm) | 1.54 | 1.27 | 1.26 | 1.54 |
|  | Unit weight (g/m²) | 425 | 375 | 408 | 439 |
|  | Mass ratio of fiber base material layer to entire (%) | 45.9 | 52.0 | 55.4 | 46.5 |
|  | Tensile strength (N/25.4 mm) | MD: 937 TD: 279 | MD: 749 TD: 230 | MD: 749 TD: 319 | MD: 931 TD: 280 |
|  | Tensile elongation (%) | MD: 30 TD: 62 | MD: 32 TD: 59 | MD: 30 TD: 55 | MD: 32 TD: 59 |
|  | Tear strength (N) | MD: 181 TD: 81 | MD: 177 TD: 78 | MD: 172 TD: 80 | MD: 179 TD: 77 |
|  | Peel strength (N/25.4 mm) | MD: 29.4 TD: 30.4 | MD: 26.5 TD: 30.4 | MD: 29.4 TD: 30.4 | MD: 28.4 TD: 29.4 |

TABLE 5-continued

|  | Example 1 | Example 2 | Example 3 | Example 4 |
|---|---|---|---|---|
| Wear durability | A<br>No scratch | A<br>No scratch | A<br>No scratch | A<br>No scratch |
| Seam strength (N) | MD: 535<br>TD: 246 | MD: 433<br>TD: 208 | MD: 488<br>TD: 246 | MD: 501<br>TD: 234 |
| Flame retardant test for automobile interior materials | A<br>Self-extinguishing in 38 mm marked line | A<br>Self-extinguishing in 38 mm marked line | A<br>Self-extinguishing in 38 mm marked line | A<br>Self-extinguishing in 38 mm marked line |
| Flame retardant test for aircraft interior materials (Machine Direction(MD)/Transverse Direction(TD)) | A<br>After-flame:<br>0.0 sec/0.0 sec<br>Drip:<br>0.0 sec/0.0 sec<br>Burn length:<br>60 mm/58 mm | A<br>After-flame:<br>0.0 sec/0.0 sec<br>Drip:<br>0.0 sec/0.0 sec<br>Burn length:<br>59 mm/52 mm | A<br>After-flame:<br>0.0 sec/0.0 sec<br>Drip:<br>0.0 sec/0.0 sec<br>burn length:<br>56 mm/57 mm | A<br>After-flame:<br>0.0 sec/0.0 sec<br>Drip:<br>0.0 sec/0.0 sec<br>Burn length:<br>67 mm/66 mm |
| Flame retardant test of seat cushion Burn length: (mm) (front of back surface)/ (rear of back surface)/ (bottom portion of seat surface)/(upper portion of seat surface) Mass loss: (%) | A<br>Burn length: 260/<br>0/390/200<br>Mass loss: 4.3 | A<br>Burn length: 230/<br>0/290/190<br>Mass loss: 4.0 | A<br>Burn length: 33/<br>0/324/203<br>Mass loss: 4.4 | B<br>Burn length: 290/<br>31/400/303<br>Mass loss: 9.2 |
| Sensory evaluation of texture of cushion | 4.2 | 4.4 | 4.0 | 4.2 |

TABLE 6

|  |  | Example 5 | Example 6 | Example 7 | Example 8 |
|---|---|---|---|---|---|
| Synthetic leather | Thickness (mm) | 1.53 | 1.54 | 1.63 | 1.53 |
|  | Unit weight (g/m$^2$) | 421 | 427 | 545 | 427 |
|  | Mass ratio of fiber base material layer to entire (%) | 47.7 | 47.8 | 35.8 | 45.7 |
|  | Tensile strength (N/25.4 mm) | MD: 797<br>TD: 216 | MD: 906<br>TD: 248 | MD: 960<br>TD: 283 | MD: 807<br>TD: 197 |
|  | Tensile elongation (%) | MD: 34<br>TD: 61 | MD: 35<br>TD: 60 | MD: 39<br>TD: 62 | MD: 34<br>TD: 56 |
|  | Tear strength (N) | MD: 181<br>TD: 78 | MD: 182<br>TD: 77 | MD: 180<br>TD: 81 | MD: 122<br>TD: 74 |
|  | Peel strength (N/25.4 mm) | MD: 29.4<br>TD: 31.4 | MD: 29.4<br>TD: 32.3 | MD: 28.4<br>TD: 30.4 | MD: 20.6<br>TD: 21.6 |
|  | Wear durability | A<br>No scratch | A<br>No scratch | A<br>No scratch | A<br>No scratch |
|  | Seam strength (N) | MD: 521<br>TD: 236 | MD: 513<br>TD: 234 | MD: 522<br>TD: 229 | MD: 489<br>TD: 197 |
|  | Flame retardant test for automobile interior materials | A<br>Self-extinguishing in 38 mm marked line | A<br>Self-extinguishing in 38 mm marked line | A<br>20 mm/min | A<br>Self-extinguishing in 38 mm marked line |
|  | Flame retardant test for aircraft interior materials (Machine Direction MD/Transverse Direction(TD)) | A<br>After-flame:<br>0.0 sec/0.0 sec<br>Drip:<br>0.0 sec/0.0 sec<br>Burn length:<br>51 mm/50 mm | A<br>After-flame:<br>0.0 sec/0.0 sec<br>Drip:<br>0.0 sec/0.0 sec<br>burn length:<br>69 mm/70 mm | A<br>After-flame:<br>0.0 sec/0.0 sec<br>Drip:<br>0.0 sec/0.0 sec<br>Burn length:<br>63 mm/69 mm | A<br>After-flame:<br>0.0 sec/0.0 sec<br>Drip:<br>0.0 sec/0.0 sec<br>Burn length:<br>69 mm/64 mm |
|  | Flame retardant test of seat cushion Burn length: (mm) (front of back surface)/ (rear of back surface)/ (bottom portion of seat surface)/(upper portion of seat surface) Mass loss: (%) | B<br>Burn length: 240/<br>0/370/399<br>Mass loss: 8.8 | B<br>Burn length: 331/<br>97/390/305<br>Mass loss: 8.9 | B<br>Burn length: 300/<br>55/400/240<br>Mass loss: 9.7 | B<br>Burn length: 254/<br>0/334/339<br>Mass loss: 5.6 |
|  | Sensory evaluation of texture of cushion | 4.2 | 4.2 | 4.4 | 4.0 |

TABLE 7

|  |  | Example 9 | Example 10 | Example 11 | Example 12 |
|---|---|---|---|---|---|
| Synthetic leather | Thickness (mm) | 1.52 | 1.49 | 1.55 | 1.53 |
|  | Unit weight (g/m$^2$) | 417 | 449 | 429 | 429 |
|  | Mass ratio of fiber base material layer to entire (%) | 46.8 | 49.9 | 47.8 | 47.8 |
|  | Tensile strength (N/25.4 mm) | MD: 923 TD: 227 | MD: 1001 TD: 327 | MD: 423 TD: 142 | MD: 943 TD: 281 |
|  | Tensile elongation (%) | MD: 34 TD: 59 | MD: 36 TD: 58 | MD: 39 TD: 58 | MD: 40 TD: 60 |
|  | Tear strength (N) | MD: 177 TD: 77 | MD: 166 TD: 78 | MD: 185 TD: 86 | MD: 178 TD: 78 |
|  | Peel strength (N/25.4 mm) | MD: 32.3 TD: 33.3 | MD: 28.4 TD: 29.4 | MD: 25.5 TD: 27.4 | MD: 28.4 TD: 30.4 |
|  | Wear durability | A No scratch | A No scratch | A No scratch | A No scratch |
|  | Seam strength (N) | MD: 53.4 TD: 25.0 | MD: 54.9 TD: 25.2 | MD: 43.6 TD: 19.1 | MD: 54.3 TD: 24.4 |
|  | Flame retardant test for automobile interior materials | A Self-extinguishing in 38 mm marked line | A Self-extinguishing in 38 mm marked line | A Self-extinguishing in 38 mm marked line | B 69 mm/min |
|  | Flame retardant test for aircraft interior materials (Machine Direction (MD)/Transverse Direction(TD)) | A After-flame: 0.0 sec/0.0 sec Drip: 0.0 sec/0.0 sec burn length: 62 mm/65 mm | A After-flame: 0.0 sec/0.0 sec Drip: 0.0 sec/0.0 sec Burn length: 62 mm/54 mm | A After-flame: 0.0 sec/0.0 sec Drip: 0.0 sec/0.0 sec burn length: 59 mm/58 mm | A After-flame: 1.3 sec/1.0 sec Drip: 0.9 sec/1.0 sec Burn length: 100 mm/95 mm |
|  | Flame retardant test of seat cushion Burn length: (mm) (front of back surface)/(rear of back surface)/(bottom portion of seat surface)/(upper portion of seat surface) Mass loss: (%) | B Burn length: 387/0/332/303 Mass loss: 5.8 | A Burn length: 265/0/324/256 Mass loss: 4.2 | A Burn length: 278/6/338/394 Mass loss: 4.9 | B Burn length: 355/78/405/398 Mass loss: 9.8 |
|  | Sensory evaluation of texture of cushion | 3.4 | 3.6 | 4.2 | 4.0 |

TABLE 8

|  |  | Comparative Example 1 | Comparative Example 2 | Reference Example 1 | Reference Example 2 |
|---|---|---|---|---|---|
| Synthetic leather | Thickness (mm) | 1.55 | 1.52 | 1.52 | 1.49 |
|  | Unit weight (g/m$^2$) | 427 | 443 | 417 | 420 |
|  | Mass ratio of fiber base material layer to entire (%) | 46.1 | 46.7 | 46.8 | 47.6 |
|  | Tensile strength (N/25.4 mm) | MD: 993 TD: 306 | MD: 949 TD: 275 | MD: 902 TD: 258 | MD: 842 TD: 639 |
|  | Tensile elongation (%) | MD: 32 TD: 57 | MD: 36 TD: 60 | MD: 32 TD: 65 | MD: 18 TD: 22 |
|  | Tear strength (N) | MD: 191 TD: 86 | MD: 172 TD: 74 | MD: 166 TD: 78 | MD: 119 TD: 100 |
|  | Peel strength (N/25.4 mm) | MD: 29.4 TD: 31.4 | MD: 29.4 TD: 29.4 | MD: 20.6 TD: 19.6 | MD: 21.6 TD: 23.5 |
|  | Wear durability | A No scratch | A No scratch | A No scratch | A No scratch |
|  | Seam strength (N) | MD: 544 TD: 247 | MD: 513 TD: 229 | MD: 415 TD: 196 | MD: 434 TD: 315 |
|  | Flame retardant test for automobile interior materials | A Self-extinguishing in 38 mm marked line | B 93 mm/min | A Self-extinguishing in 38 mm marked line | A Self-extinguishing in 38 mm marked line |
|  | Flame retardant test for aircraft interior materials (Machine Direction (MD)/Transverse Direction(TD)) | A After-flame: 0.0 sec/0.0 sec Drip: 0.0 sec/0.0 sec Burn length: 59 mm/54 mm | A After-flame: 3.2 sec/3.2 sec Drip: 1.9 sec/1.8 sec Burn length: 169 mm/170 mm | A After-flame: 0.0 sec/0.0 sec Drip: 0.0 sec/0.0 sec Burn length: 59 mm/63 mm | A After-flame: 0.0 sec/0.0 sec Drip: 0.0 sec/0.0 sec Burn length: 53 mm/59 mm |

TABLE 8-continued

|  | Comparative Example 1 | Comparative Example 2 | Reference Example 1 | Reference Example 2 |
| --- | --- | --- | --- | --- |
| Flame retardant test of seat cushion Burn length: (mm) (front of back surface)/ (rear of back surface)/ (bottom portion of seat surface)/(upper portion of seat surface) Mass loss: (%) | F Burn length: 250/ 0/320/223 Mass loss: 10.7 | F Burn length: >432/ 389/>432/390 Mass loss: 26.7 | B Burn length: 321/ 38/320/267 Mass loss: 6.6 | B Burn length: 254/ 32/330/245 Mass loss: 5.3 |
| Sensory evaluation of texture of cushion | 4.0 | 4.2 | 4.4 | 3.6 |

INDUSTRIAL APPLICABILITY

My synthetic leather and coated articles have excellent flame retardance, exhibits an excellent fire spread prevention effect when covering a combustible material, and has excellent physical properties such as texture and peel strength, and thus, can be suitably used for interior materials of automobiles, railways, ships and the like (seats, headrests, tonneau covers, sun visors, ceilings and the like), interior materials of high-rise buildings and public facilities, skin materials of furniture (chair, sofa, and the like), and the like. Among them, my synthetic is preferable as a mounting material of a seat cushion material mounted on aircraft, automobiles, or ships, and further, can be particularly suitably used for seat interiors of aircraft that require high flame retardance.

The invention claimed is:

1. A synthetic leather comprising a fiber base material layer formed of a non-woven fabric sheet and a resin layer formed on the fiber base material layer, wherein the non-woven fabric sheet includes at least one flameproof layer formed of a web including a non-melting fiber A having a high-temperature shrinkage rate of 3% or less and a thermal conductivity, conforming to ISO22007-3 (2008), of 0.060 W/m·K or less and is formed by bonding the flameproof layer to a scrim layer including a thermoplastic fiber B having an Limiting Oxygen Index (LOI) value, conforming to JIS K 7201-2 (2007), of 25 or more, and wherein the non-melting fiber A is a flameproofed fiber or a meta-aramid-based fiber and the thermoplastic fiber B is a fiber formed of a resin selected from the group consisting of flame retardant liquid crystalline polyester, flame-retardant poly(alkylene terephthalate), flame-retardant poly(acrylonitrile butadiene styrene), flame-retardant polysulfone, poly(ether-ether-ketone), poly(ether-ketone-ketone), polyethersulfone, polyarylate, polyarylene sulfide, polyphenylsulfone, polyetherimide, polyamideimide, and mixtures thereof.

2. The synthetic leather according to claim 1, further comprising an adhesive layer provided between the fiber base material layer and the resin layer.

3. The synthetic leather according to claim 2, wherein in the synthetic leather, a penetration depth of a skin resin layer or the adhesive layer into the fiber base material layer is 0.05 to 0.40 mm.

4. The synthetic leather according to claim 1, wherein a content of the non-melting fiber A is 15 to 70% by mass in the fiber base material layer.

5. The synthetic leather according to claim 1, wherein the fiber base material layer includes 30 to 85% by mass of the thermoplastic fiber B.

6. The synthetic leather according to claim 1, wherein the scrim layer included in the fiber base material layer includes 80% by mass or more of the thermoplastic fiber B.

7. The synthetic leather according to claim 1, wherein the thermoplastic fiber B is a fiber containing 15% by mass or more of a sulfur atom.

8. The synthetic leather according to claim 1, wherein the resin layer is laminated on a surface of the scrim layer of the fiber base material layer.

9. The synthetic leather according to claim 1, wherein a mass ratio of the fiber base material layer in the synthetic leather is 20 to 80% by mass.

10. The synthetic leather according to claim 1, wherein in the synthetic leather, a penetration depth of a skin resin layer into the fiber base material layer is 0.05 to 0.40 mm.

11. A covered article covered with the synthetic leather according to claim 1.

12. The covered article according to claim 11, which is a seat cushion material mounted on an aircraft, an automobile, or a ship.

* * * * *